United States Patent
Harada et al.

(10) Patent No.: US 8,638,317 B2
(45) Date of Patent: Jan. 28, 2014

(54) DISPLAY APPARATUS AND METHOD FOR CONTROLLING THE SAME

(75) Inventors: Tsutomu Harada, Kanagawa (JP); Shinya Hashimoto, Kanagawa (JP); Naoya Okada, Tokyo (JP); Tadashi Maekawa, Kanagawa (JP); Kazunori Yamguchi, Kanagawa (JP); Mitsuru Tateuchi, Kanagawa (JP); Ryoichi Tsuzaki, Kanagawa (JP); Yoshiharu Nakajima, Kanagawa (JP); Chiaki Kon, Kanagawa (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 903 days.

(21) Appl. No.: 12/048,088

(22) Filed: Mar. 13, 2008

(65) Prior Publication Data
US 2008/0231564 A1    Sep. 25, 2008

(30) Foreign Application Priority Data

Mar. 16, 2007  (JP) ................................ 2007-069515
Mar. 12, 2008  (JP) ................................ 2008-063005

(51) Int. Cl.
*G06F 3/042*   (2006.01)
*G06F 3/041*   (2006.01)
*G09G 5/00*    (2006.01)
*G06F 3/038*   (2013.01)
*G06K 11/06*   (2006.01)
*G08C 21/00*   (2006.01)
*G06K 9/40*    (2006.01)

(52) U.S. Cl.
USPC ........... 345/175; 345/156; 345/173; 345/204; 345/207; 345/211; 345/212; 178/18.01; 178/18.02; 178/18.09; 382/254; 382/264; 382/274

(58) Field of Classification Search
USPC ......... 345/204, 207, 211, 212, 156, 173, 175; 382/254–275, 276, 284; 178/18.01, 178/18.02, 18.09
See application file for complete search history.

(56) References Cited

U.S. PATENT DOCUMENTS 5,396,443 A  *  3/1995  Mese et al. .................... 713/321
6,611,921 B2 *  8/2003  Casebolt et al. .............. 713/324

(Continued)

FOREIGN PATENT DOCUMENTS

| JP | 2002-259040 | 9/2002 |
| JP | 2004-127272 | 4/2004 |

(Continued)

OTHER PUBLICATIONS

Japanese Office Action issued on May 19, 2009, for corresponding Japanese Patent Application 2008-063005.

*Primary Examiner* — Ilana Spar
(74) *Attorney, Agent, or Firm* — K&L Gates LLP

(57) ABSTRACT

Disclosed herein is a display apparatus including: a display panel having a display function and a light-receiving/imaging function; a first image processing section configured to generate a detection signal that indicates whether a to-be-detected object has been detected based on a result of first image processing performed on an image taken by the light-receiving/imaging function; a second image processing section configured to perform second image processing on the image processed by the first image processing section, the second image processing having a heavier processing load than the first image processing; and a control section configured to control an operation of the second image processing section in accordance with the detection signal generated by the first image processing section, and, when it is determined that the processing by the second image processing section is not necessary, control the second image processing section to enter a sleep state.

17 Claims, 33 Drawing Sheets

(56) References Cited

U.S. PATENT DOCUMENTS

| | | | |
|---|---|---|---|
| 6,781,570 B1* | 8/2004 | Arrigo et al. | 345/158 |
| 7,190,336 B2 | 3/2007 | Fujisawa | |
| 7,737,957 B2* | 6/2010 | Lee et al. | 345/173 |
| 2005/0178953 A1* | 8/2005 | Worthington et al. | 250/221 |
| 2006/0192766 A1* | 8/2006 | Nakamura et al. | 345/173 |
| 2008/0131007 A1* | 6/2008 | Kutka | 382/232 |

FOREIGN PATENT DOCUMENTS

| | | |
|---|---|---|
| JP | 2006-276223 | 10/2006 |
| JP | 2007-025796 | 2/2007 |
| WO | WO 2006069964 A1 * | 7/2006 |

* cited by examiner

FIG.14
IMAGE A (BACKLIGHT OFF)
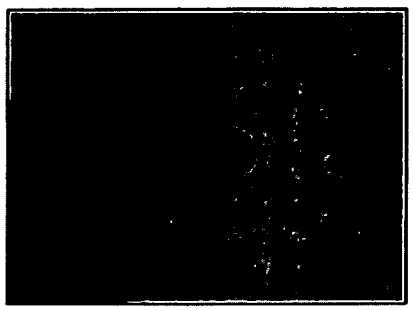
IMAGE B (BACKLIGHT ON)
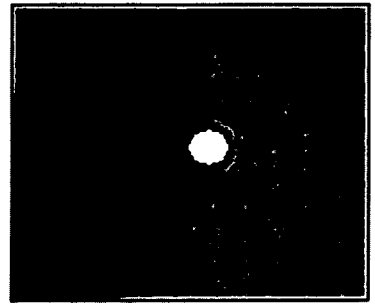
+  −
DIFFERENCE IMAGE C

F I G. 1 5 A
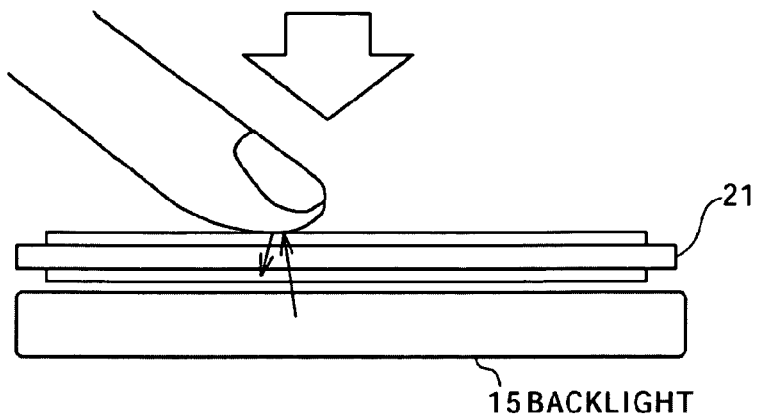
F I G. 1 5 B
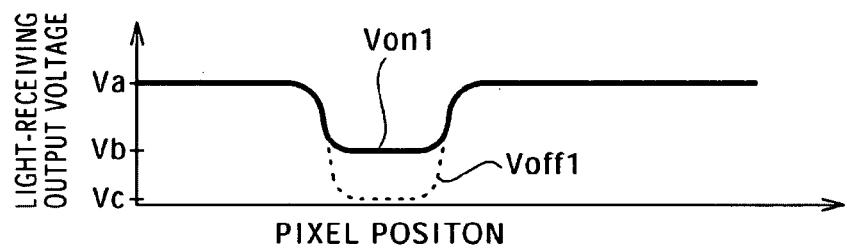
F I G. 1 6 A
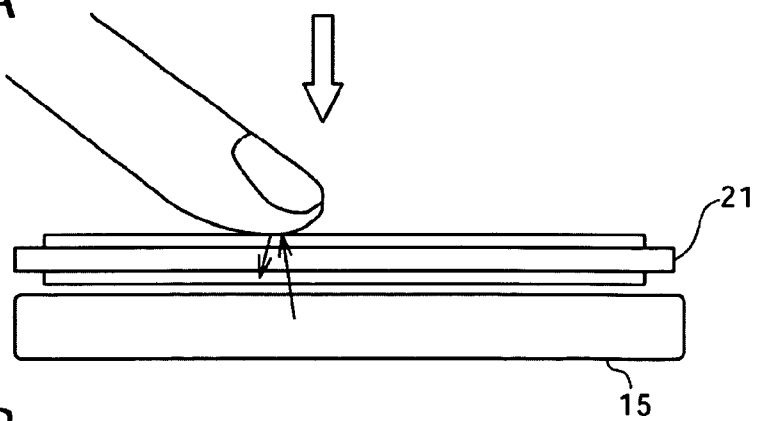
F I G. 1 6 B
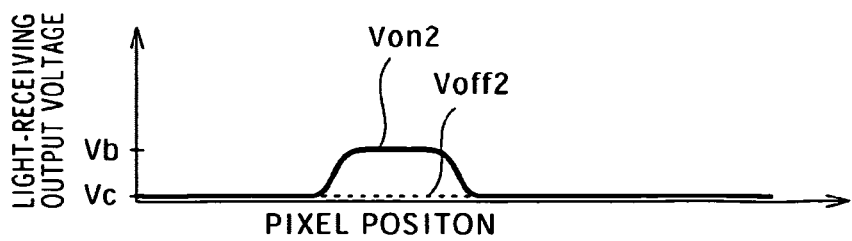

FIG.27

| | DIFFERENCE-IMAGE FINGERTIP EXTRACTION PROCESS | SHADOW-IMAGE FINGERTIP EXTRACTION PROCESS |
|---|---|---|
| ENVIRONMENTAL CHANGE | EXCELLENT | CONDITIONAL (OPERATIVE WHEN BRIGHTER THAN THRESHOLD LEVEL) |
| BACKLIGHT OFF (UNDER SUNLIGHT) | POOR | EXCELLENT |
| DISPLAY FLEXIBILITY | CONDITIONAL (AVOIDABLE BY COLOR DEFINITIONS) | EXCELLENT |
| BLACK GLOVE | POOR | EXCELLENT (BRIGHT ENVIROMENT) |
| 50 Hz FLUORESCENT LIGHT | CONDITIONAL (OK IF DARK) | CONDITIONAL (OK IF BRIGHT) |
| SPOTLIGHT | EXCELLENT | CONDITIONAL (DEPENDS ON SURROUNDING BRIHTNESS) |
| SUNSHINE FILTERING THROUGH BRANCHES OF TREES | CONDITIONAL (UNSUITABLE FOR MOTION. DEPENDS ON INTENSITY) | EXCELLENT (OK IF NOT SHARP) |
| STYLUS | CONDITIONAL (REFLECTION BALLPOINT PEN, DISPLAY COLOR DEFINITIONS) | CONDITIONAL (DETECTION ALGORITHM REQUIRED) |

611 DRAWN LINE

621 MOVEMENT OF OBJECT
(PALM TOOL)

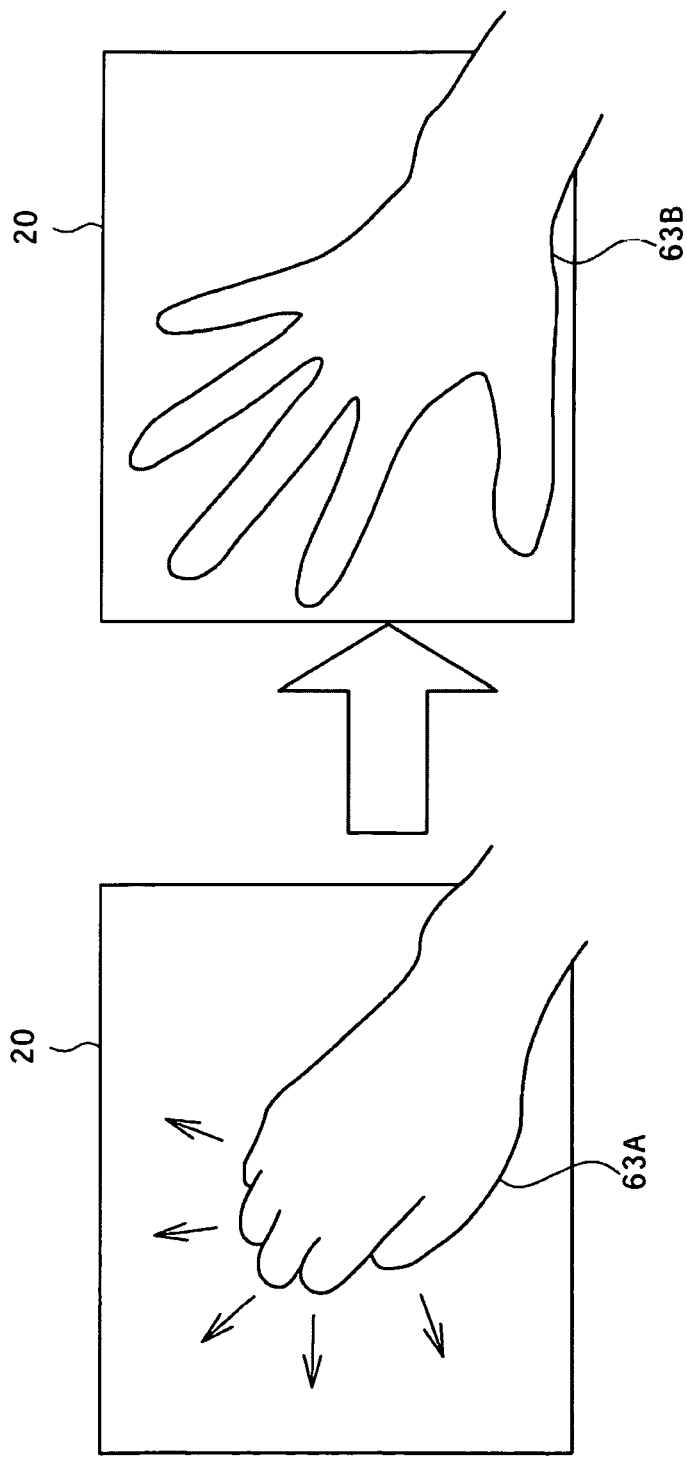

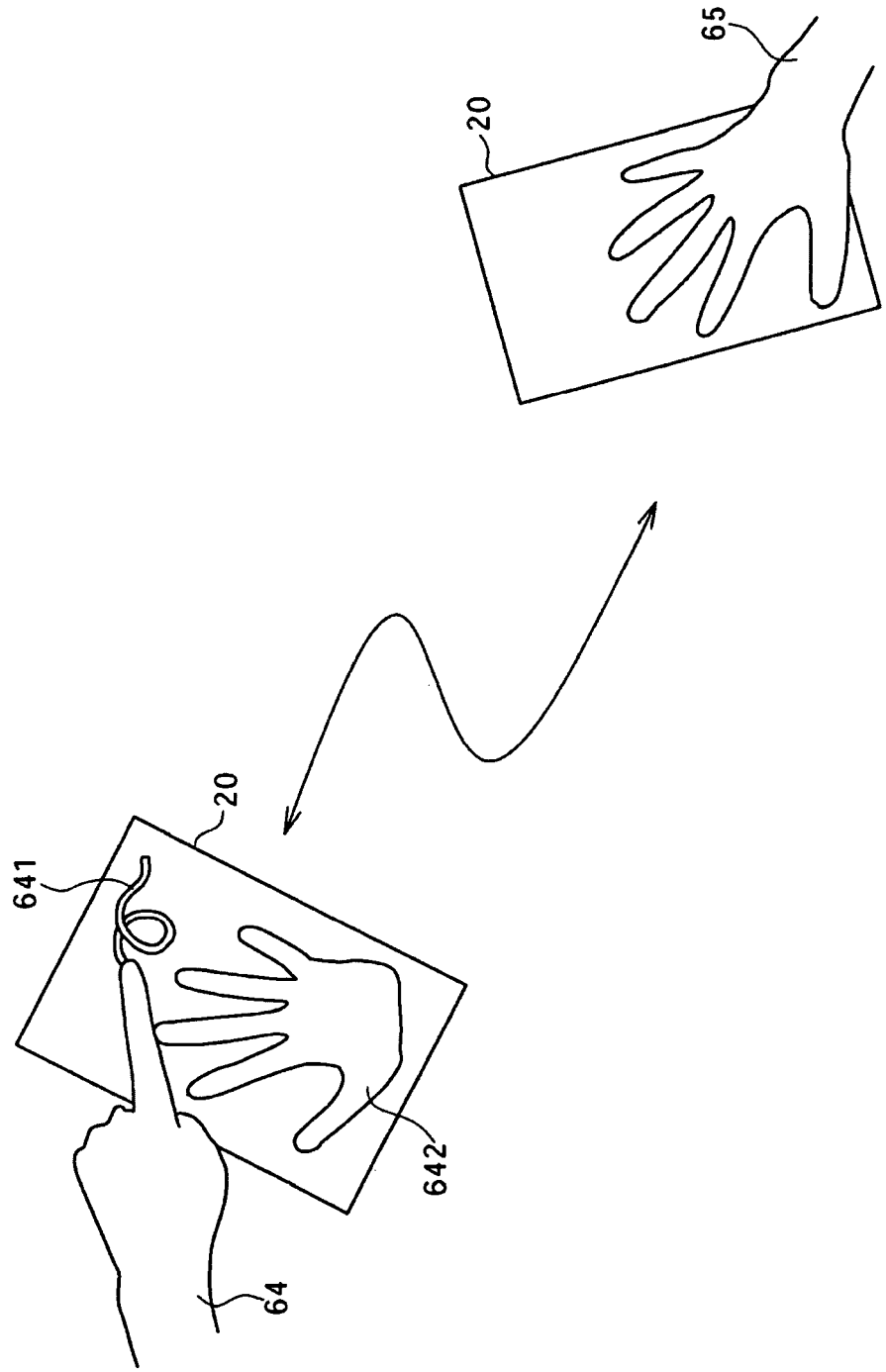

FIG.34
IMAGE C(=B-A)  　　　　　　IMAGE E(=(MA)-A-TH)
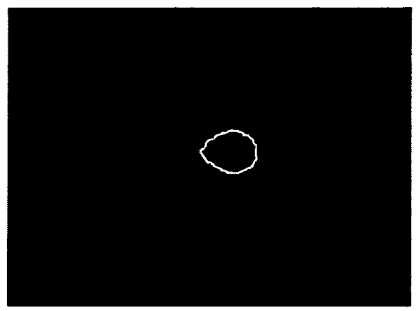 
× α
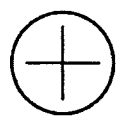
COMBINED IMAGE F(= α ×C+E)

DISPLAY APPARATUS AND METHOD FOR CONTROLLING THE SAME

CROSS REFERENCES TO RELATED APPLICATIONS

The present application claims priority to Japanese Patent Application No. 2007-069515, filed in the Japan Patent Office on Mar. 16, 2007, and to Japanese Patent Application No. 2008-063005 filed in the Japan Patent Office on Mar. 12, 2008 the entire contents of which being incorporated herein by reference.

BACKGROUND

The present application relates to a display apparatus that is suitably applied to a liquid crystal display, an organic electroluminescence (EL) display, or the like, for example. In particular, the present application relates to a display apparatus whose display area (panel) has a light-receiving element and which acquires information such as a position of an object that is in contact with or close to the panel, and a method for controlling the same.

A technology for detecting the position or the like of an object that is in contact with or close to a display surface of a display apparatus is known. In particular, a display apparatus that has a touch panel is a typical and widely used example of such a technology.

While there are various types of touch panels, that type of touch panel which detects capacitance is commonly used widely. This type of touch panel is configured to detect a change in a charge on a surface of the panel when a finger comes into contact with the touch panel, thereby detecting the position or the like of the object. The use of such a touch panel enables a user to perform an intuitive operation.

A display apparatus having a display section has been proposed (a display/imaging panel) that has a display function of displaying an image and an imaging (or detecting) function of imaging (or detecting) an object with Japanese Patent Laid-Open No. 2004-127272 (hereinafter referred to as Patent Document 1), for example.

SUMMARY

According to the display apparatus described in Patent Document 1, it is possible, when an object such as a finger has come into contact with or has come close to the display/imaging panel, for example, to detect the position or the like of the object based on an image taken by using display light (i.e., light to be detected) reflected from the object. Thus, the use of this display apparatus, which has a simple structure, makes it possible to detect the position or the like of the object without the need to provide a component such as the touch panel on the display panel.

In this type of display apparatus, however, operation of a light-receiving (input) function is necessary to determine whether or not the finger or the like is close to the surface of the panel, for example. Accordingly, even when an operation is not performed with a tip of the finger for a long time, power is constantly consumed for light reception. This unnecessary power consumption is particularly disadvantageous in a portable device powered by a battery.

An advantage of the present application is to provide in an embodiment a display apparatus that has a simple structure and is capable of detecting the position or the like of the object and reducing the unnecessary power consumption, and a method for controlling the same.

According to a first embodiment, there is provided a display apparatus including: a display panel having a display function and a light-receiving/imaging function; a first image processing section configured to generate a detection signal that indicates whether a to-be-detected object has been detected based on a result of first image processing performed on an image taken by the light-receiving/imaging function; a second image processing section configured to perform second image processing on the image processed by the first image processing section, the second image processing having a heavier processing load than the first image processing; and a control section configured to control an operation of the second image processing section in accordance with the detection signal generated by the first image processing section, and, when it is determined that the processing by the second image processing section is not necessary, control the second image processing section to enter a sleep state.

According to a second embodiment, there is provided a method for controlling a display apparatus including a display panel having a display function and a light-receiving/imaging function, the method including the steps of: generating a detection signal that indicates whether a to-be-detected object has been detected based on a result of first image processing performed on an image taken by the light-receiving/imaging function; performing second image processing on an image obtained from the first image processing, the second image processing having a heavier processing load than the first image processing; and controlling an operation of the second image processing in accordance with the detection signal generated in the generating, and, when it is determined that the second image processing is not necessary, controlling the second image processing to enter a sleep state.

According to a third embodiment, there is provided a display apparatus, including: a display panel having a plurality of display elements and a plurality of light-receiving sensors inside a display area; a first image processing section configured to perform first image processing for detecting an object that is in contact with or close to the display panel based on an output from the plurality of light-receiving sensors; a second image processing section configured to perform second image processing for obtaining information of a position in the display area of at least the detected object based on an output from the first image processing section; and a control section configured to control the second image processing section to enter a sleep state when the processing by the second image processing section is not necessary, depending on a result of detection of the object by the first image processing section.

According to an embodiment, the image taken by the light-receiving/imaging function is supplied to the first image processing section. The first image processing section determines based on the result of first image processing performed on the image taken whether the to-be-detected object, which is an object to be detected, has been detected, generates the detection signal, which indicates a result of the determination, and supplies the detection signal to the control section. The control section controls the operation of the second image processing section in accordance with the detection signal generated by the first image processing section. Then, when it is determined that processing by the second image processing section is not necessary, the second image processing section is controlled to enter the sleep state.

According to an embodiment, it is possible to detect the position or the like of an object with a simple structure, and reduce unnecessary power consumption.

Additional features and advantages are described herein, and will be apparent from the following Detailed Description and the figures.

BRIEF DESCRIPTION OF THE FIGURES

FIG. 14 shows images for describing the difference-image fingertip extraction process;

FIGS. 15A and 15B are diagrams for describing the difference-image fingertip extraction process when ambient light is bright;

FIGS. 16A and 16B are diagrams for describing the difference-image fingertip extraction process when the ambient light is dark;

FIG. 27 is a table for describing the difference-image fingertip extraction process and the shadow-image fingertip extraction process while comparing the two processes;

FIGS. 28A, 28B, 29, 30, and 31 are illustrations for describing examples of applications that use results of the fingertip extraction process;

FIG. 34 shows images for describing an image combining process as shown in FIG. 33;

DETAILED DESCRIPTION

An embodiment of the present application will be described with reference to the accompanying drawings.

[First Embodiment]

Figure 1:
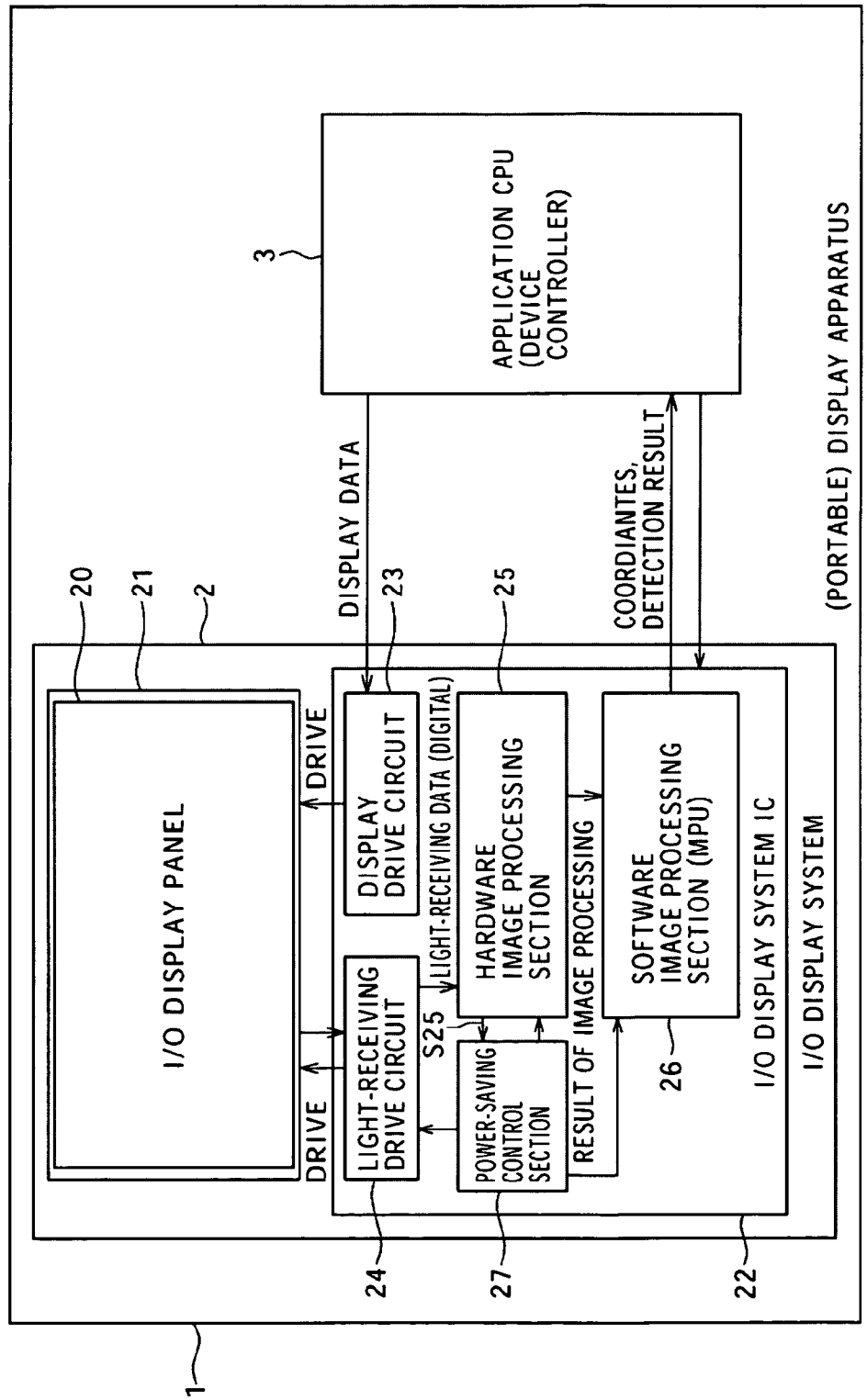
FIG. 1 is a block diagram illustrating an overall structure of a portable display apparatus according to a first embodiment.

FIG. 1 is a block diagram illustrating an overall structure of a portable display apparatus 1 according to a first embodiment.

The portable display apparatus 1 includes, as primary components, an I/O display system 2 and a device controller (an application processing section) 3.

The I/O display system 2 includes an I/O display panel 20, a backlight 21, and an I/O display system integrated circuit (hereinafter referred to as a "display IC") 22.

The I/O display system 2 in the display apparatus 1 according to the present embodiment is capable of carrying out imaging with a display surface while providing a display. The I/O display system 2 has the following functions.

Function 1) is a function of eliminating influence of ambient light based on two light-receiving images taken by turning On and Off the backlight 21 quickly, and generating an image in which a fingertip is made bright by image processing. The fingertip is an example of an object that is in contact with or close to the display surface and which is to be detected.

Function 2) is a function of performing a shadow detection process based on a light-receiving image taken when the backlight 21 is turned Off using the ambient light actively, and generating an image in which the fingertip that is in contact with or close to the display surface is made bright by image processing. Function 2) is performed in parallel with function 1).

Function 3) is a function of performing function 1) and 2) concurrently to obtain an image in which the fingertip is made bright by processing.

The above processes 1) to 3) are performed by a dedicated hardware image processing section. It is determined whether or not the fingertip is in contact with or close to the display surface based on a result obtained from function 3).

Function 4) is a function of, based on a result of processing performed by the hardware image processing section, computing information concerning the number of fingertips to be detected and coordinates, an area, and a region of the fingertip(s) by software image processing performed by a software image processing section (Micro Processing Unit (MPU)) dedicated to the present system.

The I/O display system 2 in the display apparatus 1 has the following functions to achieve power saving.

Function 5) is a function of causing the MPU used for processing to enter a sleep state automatically when no fingertip has been detected for a predetermined period of time.

When no fingertip has been detected for the predetermined period of time, it is determined that the software image processing is not necessary.

Function 6) is a function of performing light reception and image processing at longer intervals when the MPU is in the sleep state than at normal times, so that the power consumption is reduced when the MPU is in the sleep state.

Function 7) is a function of, when the hardware image processing section determines that the fingertip has come close to the display surface after the MPU had entered the sleep state, returning the MPU to a normal state so that light reception and image processing will be performed at normal intervals again.

Function 8) is a function of, when an application of a device in which the present system is implemented does not temporarily need detection of input of the fingertip or the like, suspending the supply of power for the MPU and a light-receiving function in the present system in order to reduce the power consumption. In this case, the I/O display system 2 has a function of appropriately performing a procedure for allowing the MPU to enter a sleep mode.

The I/O display panel 20 is formed by a liquid crystal panel (a liquid crystal display (LCD)) throughout which pixels (display elements) are arranged in a matrix, for example. The I/O display panel 20 has a function (i.e., a display function) of displaying an image of a predetermined figure, character, or the like based on display data while performing a line sequential operation. In addition, the I/O display panel 20 has a function (i.e., an imaging function) of imaging an object that is in contact with or close to the I/O display panel 20, as described below. The backlight 21 functions as a light source for the I/O display panel 20, in which a plurality of light-emitting diodes are arranged, for example. The backlight 21 is controlled to be turned On and Off quickly with predetermined timing synchronous with operation timing of the I/O display panel 20, as described below.

The display IC 22 includes a display drive circuit 23, a light-receiving drive circuit 24, a hardware image processing section (i.e., a first image processing section) 25, a software image processing section (i.e., a second image processing section) 26, and a power-saving control section 27.

The display drive circuit 23 drives the I/O display panel 20 so as to display the image based on the display data (i.e., so as to perform a display operation) while performing the line sequential operation.

The light-receiving drive circuit 24 drives the I/O display panel 20 so as to obtain light-receiving data (i.e., so as to image the object) while performing the line sequential operation. Note that the light-receiving drive circuit 24 accumulates light-receiving data of each pixel in frame memory (not shown) on a frame-by-frame basis, for example, and outputs the light-receiving data to the first image processing section 25 as an image taken.

The first image processing section (i.e., the hardware image processing section) 25 performs a reflection detection process (a dark/light difference process) as a first process. The reflection detection process is a process of eliminating the influence of the ambient light based on the two light-receiving images taken by turning On and Off the backlight 21 quickly, and generating an image in which a fingertip that is in contact with or close to a surface of the I/O display panel 20 is made bright by image processing. The first image processing section 25 also performs the shadow detection process as a second process. The shadow detection process is performed based on the light-receiving image taken when the backlight 21 is Off using the ambient light actively, and generates an image in which the fingertip that is in contact with or close to the surface is made bright by image processing. The first image processing section 25 performs the reflection detection process (i.e., the first process) and the shadow detection process (i.e. the second process) concurrently to obtain the image in which the fingertip is made bright by processing. Then, the first image processing section 25 performs a process (i.e., a third process) of combining the image obtained by the reflection detection process (i.e., the first process) and the image obtained by the shadow detection process (i.e., the second process), and thereafter performs a finger approach detection process (i.e., a fourth process) for detecting that a finger, which is the object to be detected, has come close to the surface of the I/O display panel 20. The first image processing section 25 outputs a result of the image processing to the second image processing section 26, and outputs, to the power-saving control section 27, a finger approach detection signal S25 (find_obj) as a result of the finger approach detection process. The finger approach detection signal S25 may be supplied to the power-saving control section 27 via another processing section, and the finger approach detection signal S25 is also included in a detection signal to be outputted from the first image processing section 25 to the power-saving control section 27.

Figure 2:
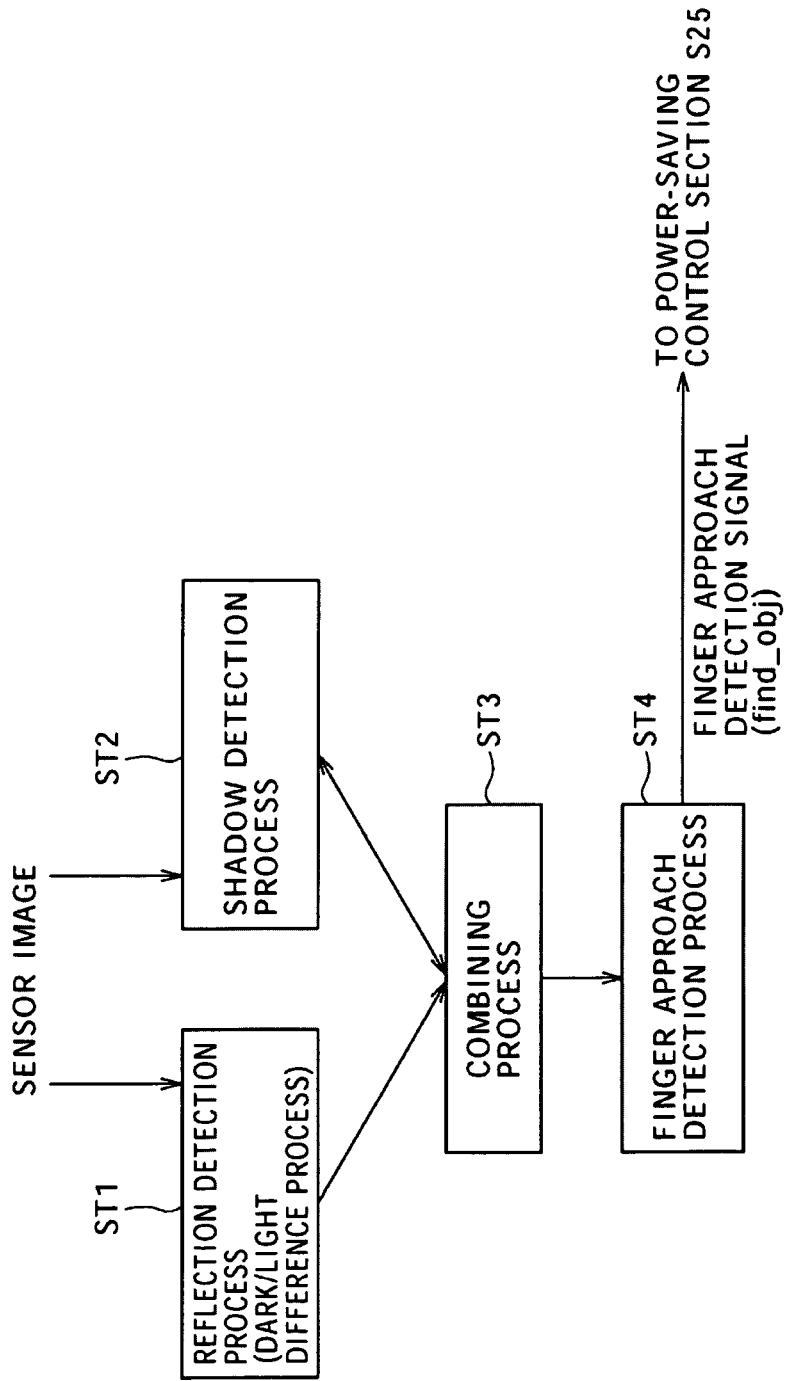
FIG. 2 is a flowchart illustrating a procedure performed by a first image processing section (i.e., a hardware image processing section) according to an embodiment.
Figure 3:
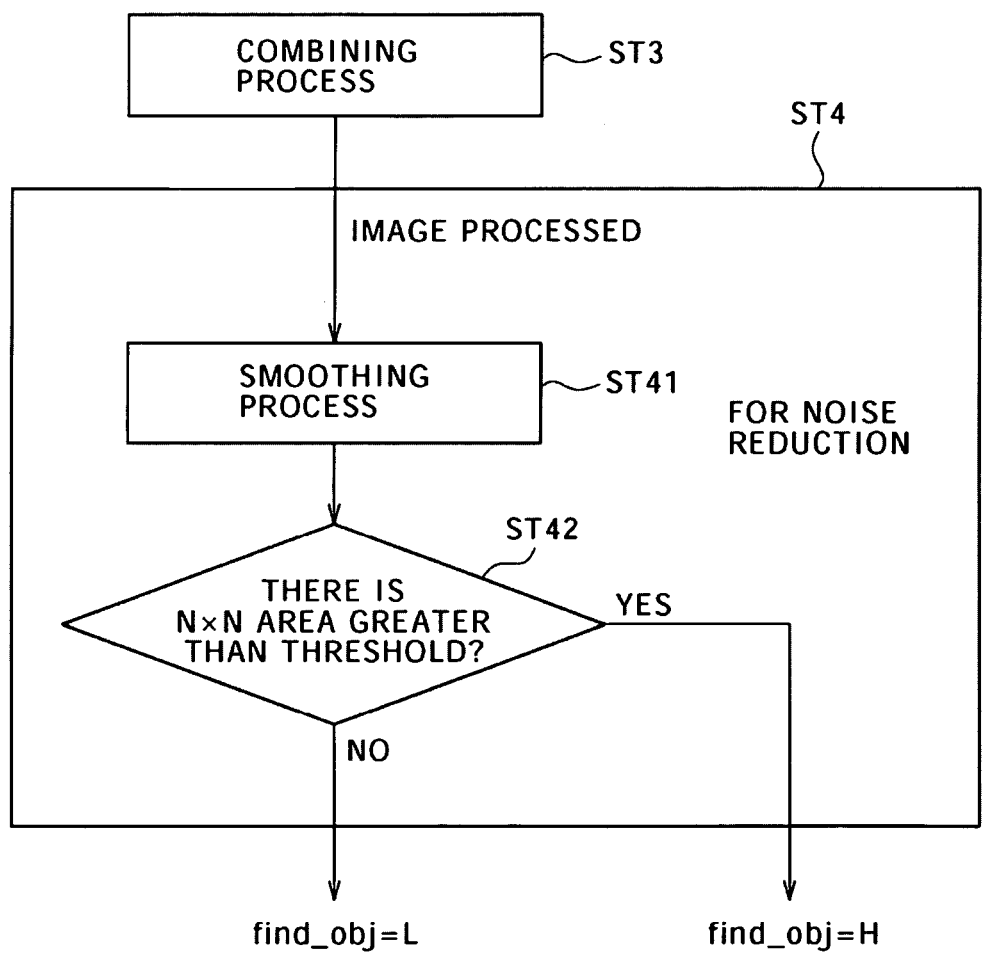
FIG. 3 is a flowchart illustrating a procedure of a finger approach detection process in FIG. 2.

FIG. 2 is a flowchart illustrating a procedure performed by the first image processing section (i.e., the hardware image processing section) 25 according to the present embodiment. FIG. 3 is a flowchart illustrating the finger approach detection process in FIG. 2.

As shown in FIG. 2, the first image processing section 25 performs the reflection detection process (i.e., the first process) and the shadow detection process (i.e., the second process) concurrently at steps ST1 and ST2. Then, at step ST3, the first image processing section 25 performs the process (i.e., the third process) of combining the image obtained by the reflection detection process (i.e., the first process) and the image obtained by the shadow detection process (i.e., the second process). Thereafter, the first image processing section 25 performs the finger approach detection process at step ST4. Referring to FIG. 3, in the finger approach detection process at step ST4, the first image processing section 25 performs a smoothing process on an image obtained as a result of the combining of the two images for noise reduction at step ST41. Then, the first image processing section 25 determines whether there is an N×N area that is greater in size than a threshold at step ST42. If the first image processing section 25 determines at step ST42 that there is such an area, the first image processing section 25 outputs, to the power-saving control section 27, the finger approach detection signal S25 (find_obj) with a high level, judging that the finger, which is the object to be detected, has come close to the surface of the I/O display panel 20 and that this approach has been detected. If the first image processing section 25 determines at step ST42 that there is not such an area, the first image processing section 25 outputs, to the power-saving control section 27, the finger approach detection signal S25 (find_obj) with a low level, judging that the finger, which is the object to be detected, has not come close to the surface of the I/O display panel 20.

Based on a result of the processing performed by the first image processing section (i.e., the hardware image processing section) 25, the second image processing section (i.e., the software image processing section (MPU)) 26 computes information concerning the number of fingertips to be detected and coordinates, an area, and a region of the fingertip(s) by software image processing, and detects and obtains information concerning the object that is in contact with or close to the I/O display panel 20 (e.g., position coordinate data or data concerning the shape or size of the object). The processing performed by the second image processing section 26 has a heavier load and greater power consumption than the processing performed by the first image processing section 25. Therefore, at the time of a power-saving mode, the power-saving control section 27 controls the second image processing section 26 to enter an Off state. A result of the processing performed by the second image processing section 26 is supplied to the device controller 3. Details of the processing performed the first and second image processing sections will be described later.

The power-saving control section 27 receives the finger approach detection signal S25 (find_obj) from the first image processing section 25, and performs On/Off control of the second image processing section 26. When the power-saving control section 27 receives the finger approach detection signal S25 (find_obj) and determines that no fingertip has been detected for the predetermined period of time, the power-saving control section 27 judges that the software image processing is not necessary and automatically causes the second image processing section (MPU) 26 used for processing to enter the sleep state. While the MPU is in the sleep state, the power-saving control section 27 causes light reception and image processing to be performed at longer intervals than at normal times, thereby reducing the power consumption. When it is determined, after the MPU entered the sleep state, that the first image processing section (i.e., the hardware image processing section) 25 has detected the approach of the fingertip, the power-saving control section 27 returns the MPU to the normal state so that light reception and image processing will be performed at normal intervals again. In addition, the power-saving control section 27 has the function of, when the application of the device in which the present system is implemented does not temporarily need the detection of the input of the fingertip or the like, suspending the supply of the power for the MPU and the light-receiving function in the present system in order to reduce the power consumption. In this case, the power-saving control section 27 has the function of appropriately performing the procedure for allowing the MPU to enter the sleep mode. When causing the MPU to enter the sleep state, the power-saving control section 27 controls a clock enable signal MPU_clk_en for the MPU to become inactive, for example. Details of power-saving control by the power-saving control section 27 will be described later.

A reason why the power-saving control is performed in the present embodiment will now be described below. In the I/O display system 2, operation of a light-receiving (input) function is necessary to determine whether or not the fingertip or the like is close to the surface of the I/O display panel 20. Thus, if power were constantly consumed for light reception even while an operation is not performed with the fingertip for a long time, use of the I/O display system 2 would be unsuitable for a portable device. In actual usage, an operation is not constantly performed on the display panel in many cases. For example, suppose that the I/O display system 2 is applied to a display panel of a digital camera. In this case, operations will not be performed on the display panel frequently when pictures are taken, whereas operations will be performed on the display panel mostly when pictures are reproduced or when camera setting or the like is performed.

The I/O display system 2 according to the present embodiment has three major functional blocks for information processing for light reception: an analog circuit used for light reception and a digital conversion section; the first image processing section (i.e., the hardware image processing section) 25; and the second image processing section (i.e., the software image processing section (MPU)) 26. Continuous operation of these three blocks is not practical for the portable device from the viewpoint of power consumption. In particular, the operation of the second image processing section 26 is necessary only when very precise computation is necessary, and the determination of whether or not the operation is being performed on the I/O display panel 20 is achieved only by the analog circuit used for light reception, the digital conversion section, and the first image processing section (i.e., the hardware image processing section) 25. Accordingly, in the present embodiment, the power-saving control section 27 controls the operation of the second image processing section 26 in order to reduce unnecessary power consumption.

The device controller 3 performs processing in accordance with predetermined application software based on a detection result produced by the second image processing section 26. For example, the device controller 3 allows the display data to include the coordinates of the position of the detected object, and allows the coordinates to be displayed on the I/O display panel 20. Note that the display data generated by the device controller 3 is supplied to the display drive circuit 23.

Figure 4:
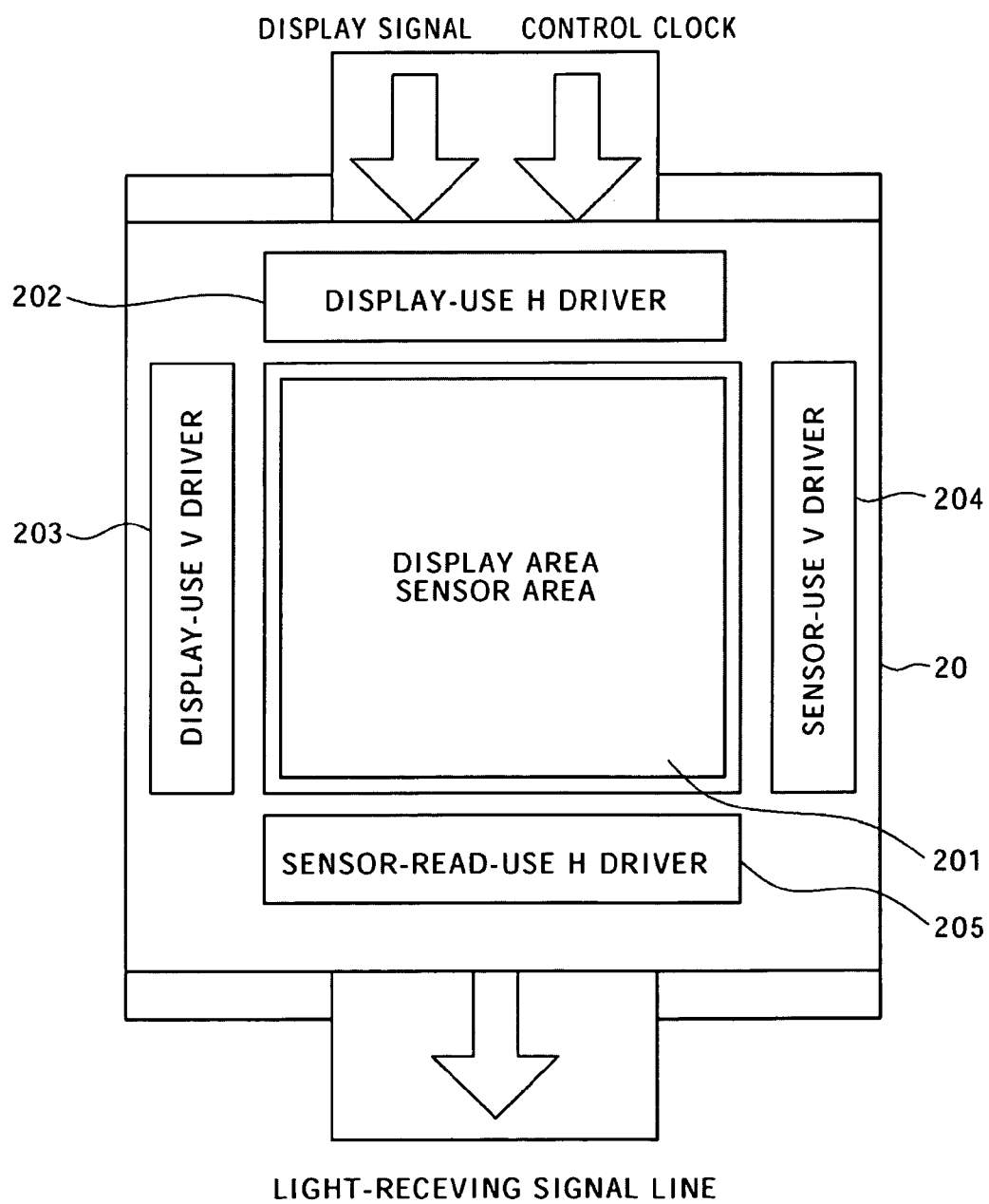
FIG. 4 is a block diagram illustrating an exemplary structure of an I/O display panel as shown in FIG. 1.

Next, an example of the details of the structure of the I/O display panel 20 will now be described below with reference to FIG. 4. The I/O display panel 20 includes a display area (sensor area) 201, a display-use H driver 202, a display-use V driver 203, a sensor-use V driver 204, and a sensor-read-use H driver 205.

The display area (sensor area) 201 is an area for modulating light coming from the backlight 21 to emit display light and, in addition, imaging the object that is in contact with or close to this area Liquid crystal elements, which are display elements (i.e., light-emitting elements), and light-receiving elements (i.e., imaging elements) described later are each arranged in a matrix on the display area (sensor area) 201. Here, note that the number of light-receiving elements may be different from the number of display elements. For example, the light-receiving elements may be more infrequent than the display elements.

Based on a control clock and a display signal used for display driving supplied from the display drive circuit 23, the display-use H driver 202 drives the liquid crystal elements in the pixels within the display area 201 in a line-sequential manner in conjunction with the display-use V driver 203.

The sensor-read-use H driver 205 drives the light-receiving elements in the pixels within the display area (sensor area) 201 in the line-sequential manner in conjunction with the sensor-use V driver 204 to obtain a light-receiving signal.

Figure 5:
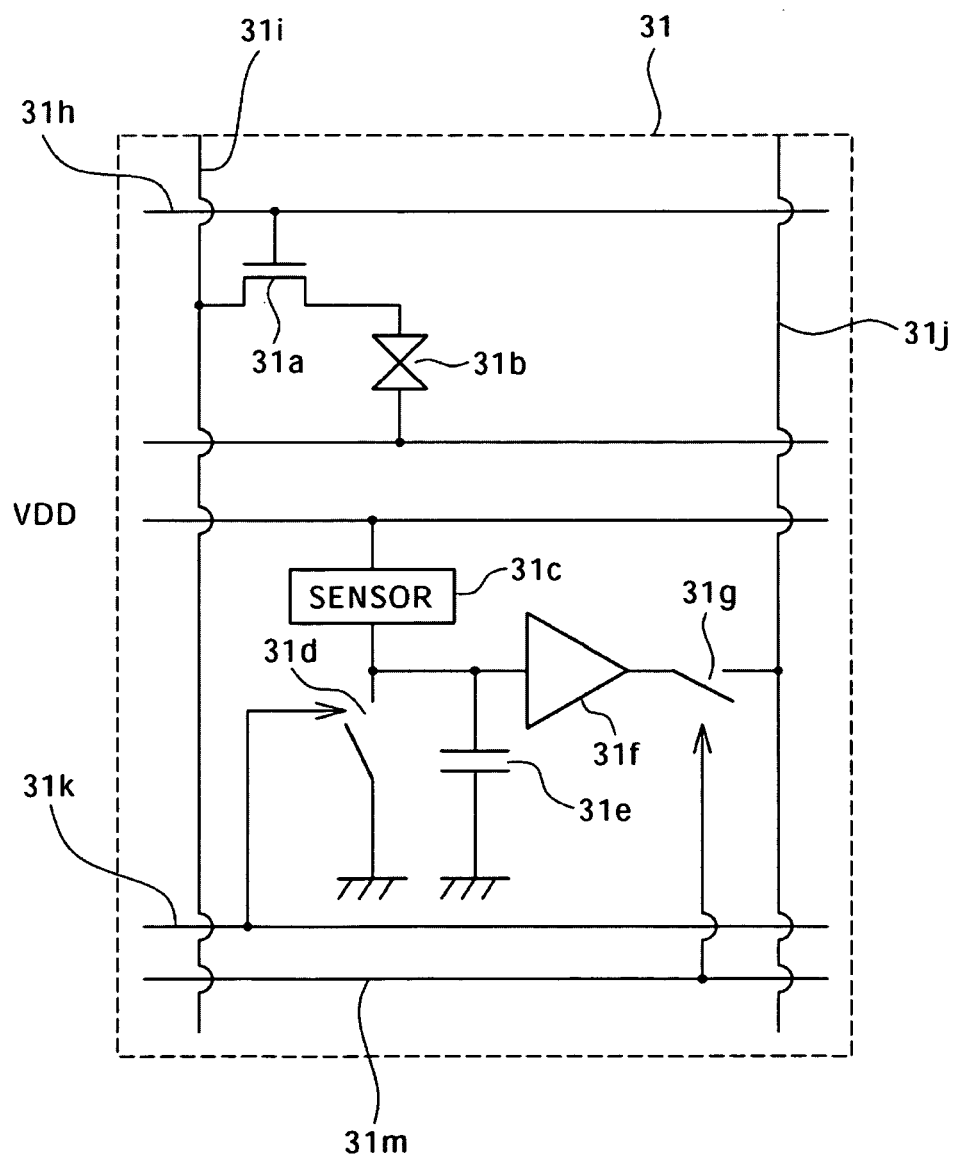
FIG. 5 is a circuit diagram illustrating an exemplary structure of a pixel.

Next, an example of the details of the structure of each pixel in the display area 201 will now be described below with reference to FIG. 5. A pixel 31 shown in FIG. 5 is composed of a liquid crystal element, which is a display element, and a light-receiving element.

Specifically, on the display element side, a switching element 31a, which is formed by a thin film transistor (TFT) or the like, is arranged at an intersection of a gate electrode line 31h extending in a horizontal direction and a drain electrode line 31i extending in a vertical direction, and a pixel electrode 31b including a liquid crystal is arranged between the switching element 31a and an opposite electrode. The switching element 31a is turned On and Off based on a driving signal supplied via the gate electrode line 31h, and a pixel voltage is applied to the pixel electrode 31b based on a display signal supplied via the drain electrode line 31i when the switching element 31a is in an On state, so that a display state is set.

On the other hand, on the light-receiving element side, which is adjacent to the display element, a light-receiving sensor 31c formed by a photodiode or the like, for example, is arranged, and a power supply voltage VDD is supplied to the sensor 31c. In addition, a reset switch 31d and a capacitor 31e are connected to the light-receiving sensor 31c. A charge corresponding to the amount of light received is accumulated in the capacitor 31e, while the reset switch 31d carries out resetting. The charge accumulated is supplied to a signal-output-use electrode line 31j via a buffer amplifier 31f when a read switch 31g is turned On, so that the charge is outputted to the outside. An On and Off operation of the reset switch 31d is controlled by a signal supplied via a reset electrode line 31k, and an On and Off operation of the read switch 31g is controlled by a signal supplied via a read control electrode line 31m.

Figure 6:
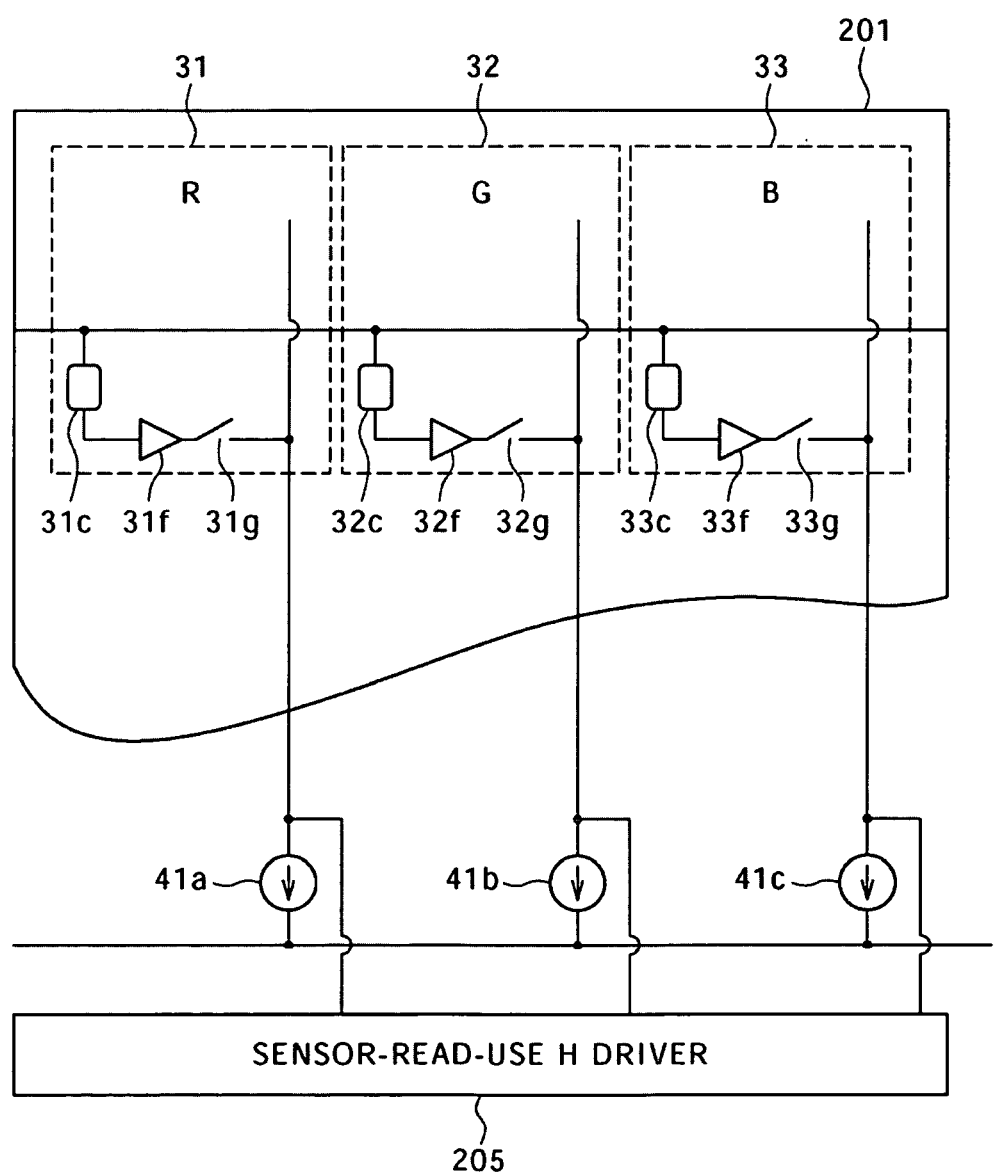
FIG. 6 is a circuit diagram for describing a manner in which pixels and a sensor-read-use H driver are connected.

Next, connection between each pixel within the display area 201 and the sensor-read-use H driver 205 will now be described below with reference to FIG. 6. In the display area 201, a pixel 31 for red (R), a pixel 32 for green (G), and a pixel 33 for blue (B) are arranged in parallel.

Charges accumulated in capacitors connected to light-receiving sensors 31c, 32c, and 33c in the pixels are amplified by buffer amplifiers 31f, 32f, and 33f, respectively, and supplied to the sensor-read-use H driver 205 via signal-output-use electrode lines when read switches 31g, 32g, and 33g, respectively, are tuned On. Note that constant current sources 41a, 41b, and 41c are connected to the signal-output-use electrode lines, so that a signal corresponding to the amount of light received can be detected by the sensor-read-use H driver 205 with excellent sensitivity.

Next, the operation of the display apparatus according to the present embodiment will now be described in detail below.

First, basic operations of the display apparatus, i.e., an image display operation and an object imaging operation, will be described. Thereafter, a power-saving control operation of the power-saving control section 27 will be described.

In this display/imaging apparatus, the display drive circuit 23 generates a display-use driving signal based on the display data supplied from the device controller 3, and based on this driving signal, the I/O display panel 20 is driven in the line-sequential manner to display an image. At this time, the backlight 21 is driven by the display drive circuit 23 to perform a light On/Off operation in synchronism with the I/O display panel 20.

Figure 7:
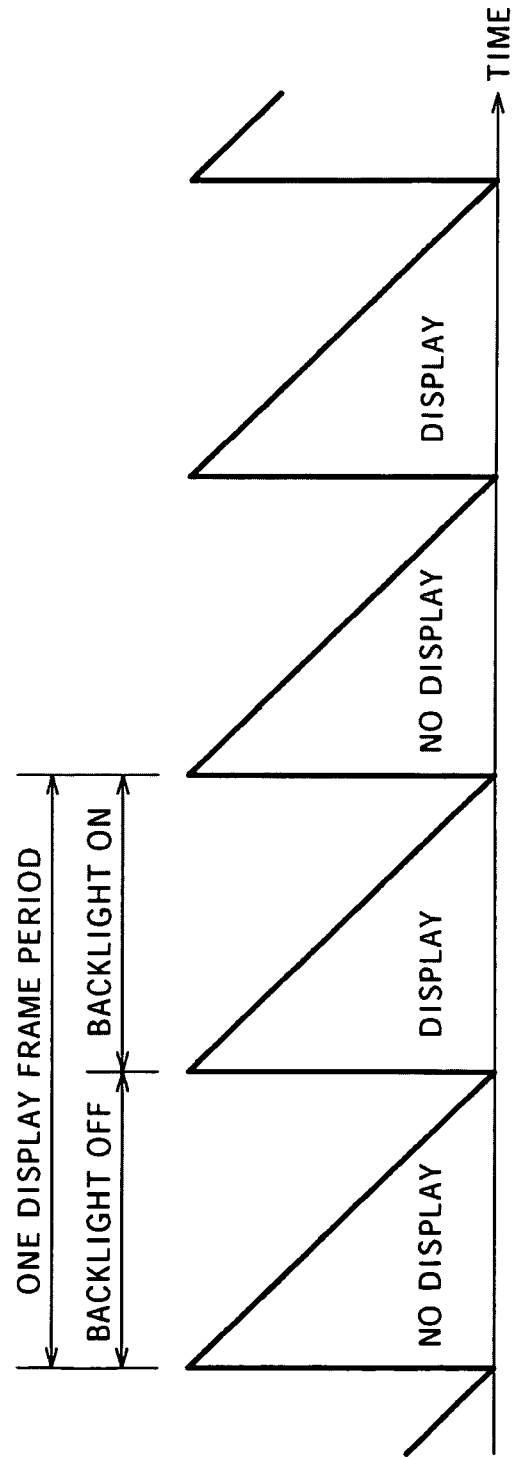
FIG. 7 is a timing chart for describing relationships between an On/Off state of a backlight and a display state.

Here, relationships between an On/Off state of the backlight 21 and a display state of the I/O display panel 20 will now be described below with reference to FIG. 7.

For example, suppose that image display is performed with a frame period of 1/60 seconds. In this case, during the first half of each frame period (1/120 seconds in length), the backlight 21 does not provide illumination (i.e., is in an Off state), so that a display is not provided. Meanwhile, during the second half of each frame period, the backlight 21 provides illumination (i.e., is in an On state) and the display signal is supplied to each pixel, so that an image for that frame period is displayed.

As described above, the first half of each frame period is a dark period during which the display light is not emitted from the I/O display panel 20, whereas the second half of each frame period is a light period during which the display light is emitted from the I/O display panel 20.

Here, when there is an object (e.g., a fingertip) that is in contact with or close to the I/O display panel 20, this object is imaged by the light-receiving elements in the pixels within the I/O display panel 20 as a result of the light-receiving drive circuit 24 driving the light-receiving elements in the line-sequential manner, and the light-receiving signal is supplied from each of the light-receiving elements to the light-receiving drive circuit 24. Light-receiving signals supplied from pixels corresponding to one frame are accumulated in the light-receiving drive circuit 24, and the light-receiving signals are outputted to the first image processing section 25 as an image taken.

Then, the second image processing section 26 performs predetermined image processing (computation processing), which will be described in detail later, based on the image taken, so as to detect information (e.g., the position coordinate data or the data concerning the shape or size of the object) concerning the object that is in contact with or close to the I/O display panel 20.

Figure 8:
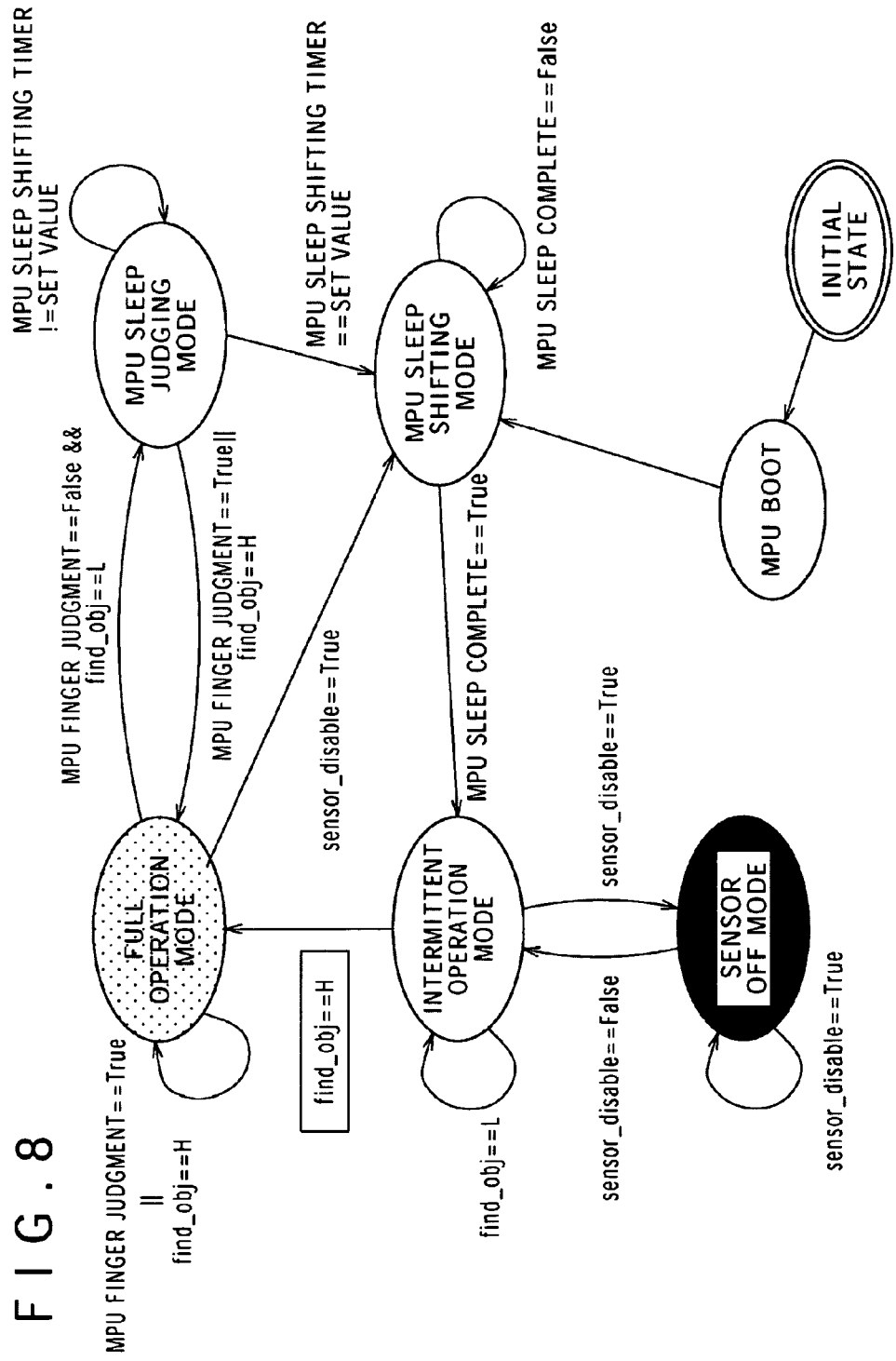
FIG. 8 is a state transition diagram of a power-saving sequence according to an embodiment.
Figure 9:
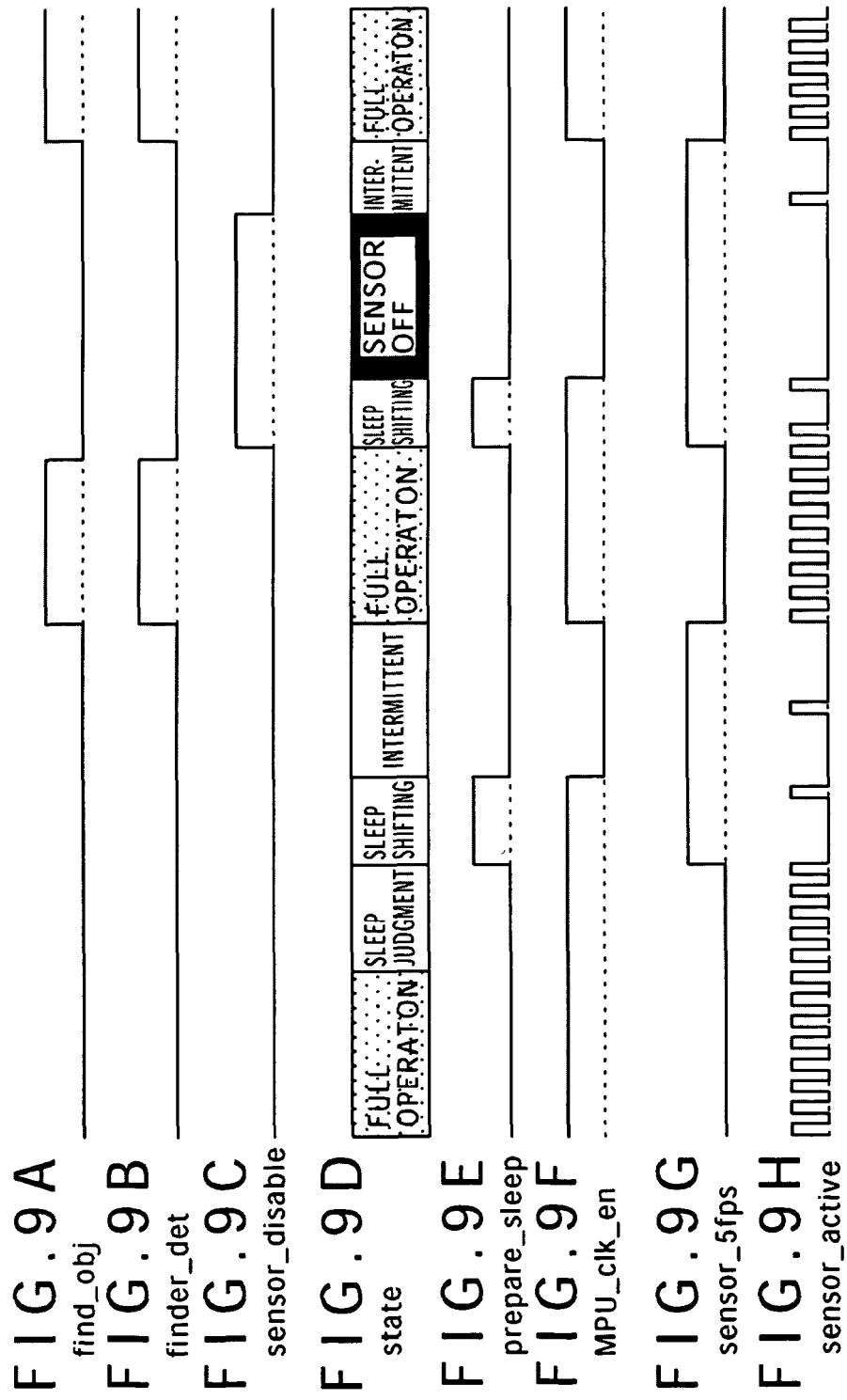
FIG. 9 is a diagram illustrating pulse sequences of power-saving control.

Next, the power-saving control operation of the power-saving control section 27 will now be described below with reference to FIG. 8 and FIGS. 9A to 9H. FIG. 8 is a state transition diagram of a power-saving sequence according to the present embodiment. FIGS. 9A to 9H show pulse sequences of the power-saving control. FIG. 9A shows the finger approach detection signal find_obj. FIG. 9B shows a finger detection signal finger_det. FIG. 9C shows a sensor disable signal sensor_disable. FIG. 9D shows a state. FIG. 9E shows a sleep shifting signal prepare_sleep. FIG. 9F shows a MPU clock enable signal MPU_clk_en. FIG. 9G shows sensor inactive periods sensor__5fps. FIG. 9H shows a sensor active signal sensor_active.

Since a fixed procedure is necessary for causing the MPU to enter the sleep state or return the MPU to the normal state in the present embodiment, a state transition that satisfies it as shown in FIG. 8 is realized. Meanwhile, hardware and an algorithm for detecting the approach of the fingertip or the like while the MPU is in the sleep state are necessary. Since the hardware is not fitted for sophisticated processing, such as labeling, as performed by the MPU, a simplified dedicated algorithm is prepared (see FIG. 3). In the present embodiment, state transition control and an operation mode for power saving and judging-use hardware are prepared as a system that fulfills all of the above, so that increase in power consumption is prevented.

As shown in FIG. 8, three operation modes for implementing a power saving function and two transitional states are defined in the present embodiment.

In a full operation mode, the light-receiving sensors are allowed to operate constantly. In the full operation mode, the I/O display panel 20 is most sensitive to an operation performed thereon. Sensor information on the screen is normally processed 60 times per second. Note that the sensors are scanned 120 times per second, since two images are obtained when the backlight is in the On state and in the Off state.

Meanwhile, in an intermittent operation mode, sensor processing is performed only one to several times per second, so that power consumed for sensor reading, power consumed for image processing, and power consumed by the MPU are reduced. If no operation has been performed on the I/O display system 2 in the full operation mode for the predetermined period of time, the internal MPU is automatically shifted to the sleep state, leading to the intermittent operation mode.

Further, when the device controller 3 judges that use of the function of the I/O display is not necessary, the I/O display system 2 shifts to a sensor Off mode. An instruction for shifting to the sensor Off mode is explicitly notified from the device controller 3 using the sensor disable signal sensor_disable. Upon receipt of this instruction, the I/O display system 2 carries out a procedure for causing the MPU used for image processing to shift to the sleep state and then turns Off the sensors, so that the I/O display system 2 enters a state in which the power consumption is reduced to a minimum. When sensor_disable has been cancelled, the I/O display system 2 first shifts to the intermittent operation mode.

The first image processing section (i.e., the hardware image processing section) 25 has a capability to detect the approach of the finger without the need to rely on judgment by the MPU (i.e., the second image processing section). The detection of the approach of the finger is achieved in the following manner. That is, if a bright area whose size is greater than a certain threshold is found from a result of hardware image processing, the first image processing section 25 judges that this area may correspond to the finger, and notifies the power-saving control section 27 of this fact. Upon receipt of this notification, the power-saving control section 27 causes the MPU to shift to an operating state if the MPU is in the sleep state, and causes a sensor drive circuit and image processing hardware to shift from the intermittent operation mode to the full operation mode.

The above arrangement makes it possible that the full operation mode be applied only when necessary. Thus, reduction in the power consumption of the device is achieved.

<On Power Consumption and Quickness of Reaction>

The quickness of reaction and the power consumption vary depending on whether the mode is the full operation mode or the intermittent operation mode, and depending on the operation interval when the mode is the intermittent operation mode. The power consumption is important in the portable device, whereas the quickness of reaction should be given priority in the case of a system in which the power consumption is unlikely to pose a problem. As an example of implementation to the portable device, a standard arrangement proposed here is "full operation=60 frames per second, intermittent operation=2 frames per second" on the assumption that one set of sensor processes is defined as one frame (two instances of scanning performed when the backlight is ON and OFF are defined as one set). In this case, the power consumption in the intermittent operation mode is less than about one-thirtieth of that in the full operation mode (because the MPU is caused to enter the sleep state, the power consumption is reduced additionally). In the case where there is a desire to achieve quicker response in the intermittent operation mode, the intermittent operation mode may be set at 10 frames per second, for example. In this case, a response is made within 0.1 seconds, and therefore, shifting to the full operation mode is achieved so quickly that almost no people would notice it. In this case, however, the power consumption in the intermittent operation mode is about five times as great as that in the case of the standard arrangement.

The basic structure and the power-saving control according to the present embodiment have been described above. Hereinafter, image processing according to the present embodiment will be described in more detail.

Figure 11:
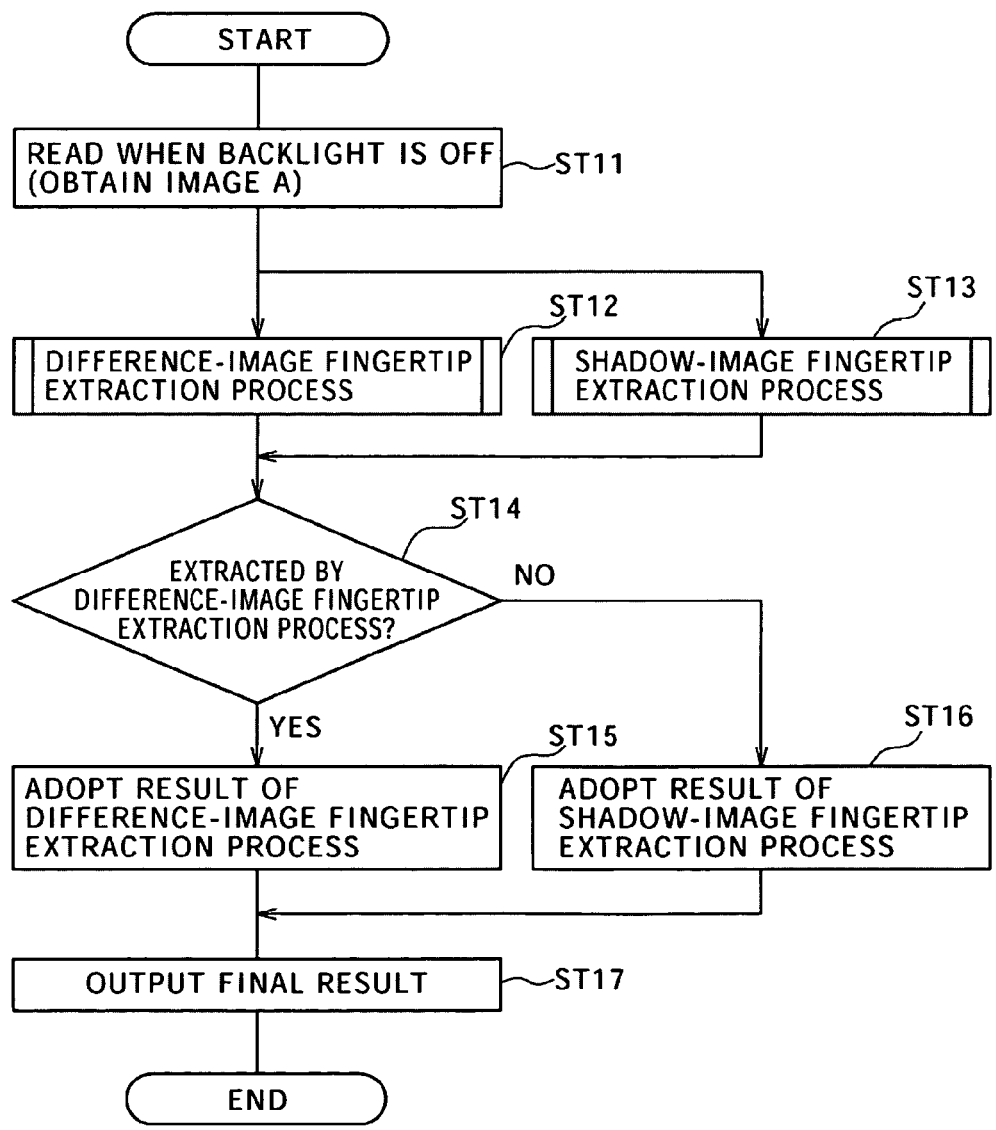
FIG. 11 is a flowchart illustrating a fingertip extraction process according to a second embodiment.
Figure 12:
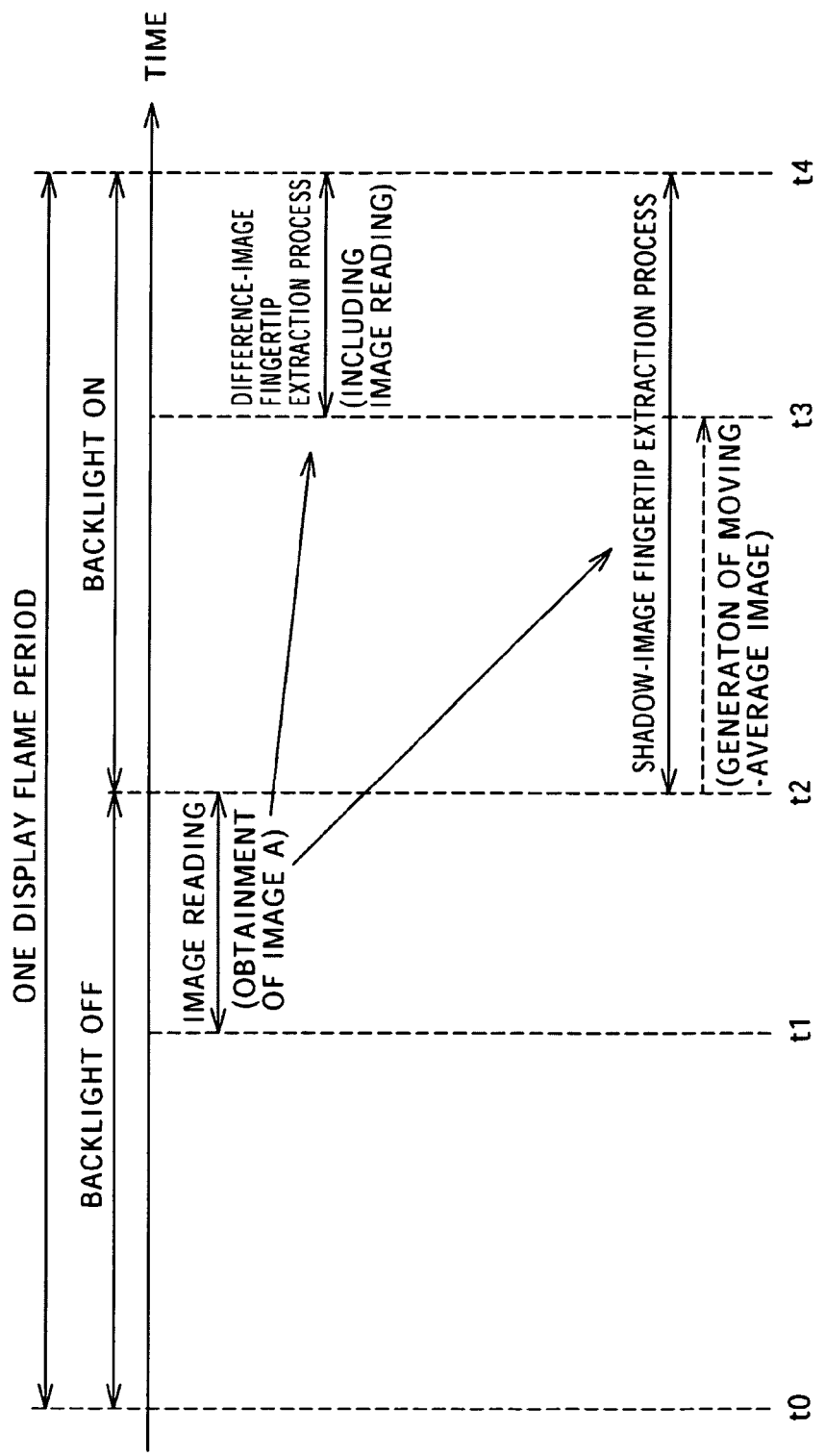
FIG. 12 is a timing chart for describing extraction processes in FIG. 11.

Next, with reference to FIGS. 11 to 27, the details of a process (i.e., a fingertip extraction process) of extracting the object (an adjacent object), such as the fingertip, that is in contact with or close to the I/O display panel 20 will now be described below. This process is achieved by image processing and is one important feature of the present invention. FIG. 11 is a flowchart of the fingertip extraction process performed by the image processing sections. FIG. 12 is a timing chart showing a part of the fingertip extraction process.

The I/O display panel 20 performs a process of imaging the adjacent object during the first half (i.e., the dark period) of one display frame period, in which the backlight 21 is in the Off state, so that image A (a shadow image) is obtained (step ST11 in FIG. 11, and FIG. 12).

Next, the I/O display panel 20 performs a process of imaging the adjacent object during the second half (i.e., the light period) of the one display frame period, in which the backlight 21 is in the On state, so that image B (a display-light-using image) is obtained (FIG. 12). Then, a fingertip extraction process (i.e., a difference-image fingertip extraction process) is performed, for example, by the first image processing section 25 based on difference image C, which is a difference between the image B and the image A (step ST12).

In parallel with the difference-image fingertip extraction process, a fingertip extraction process (i.e., a shadow-image fingertip extraction process) is performed by the first image processing section 25 based on the image A (i.e., the shadow image) (step ST13 and FIG. 11).

Next, the first image processing section 25 determines whether the fingertip has been extracted (i.e., information concerning the position, shape, size, or the like of the adjacent object, such as the fingertip, has been obtained) by the difference-image fingertip extraction process at step ST12 (step ST14). If it is determined that the fingertip has been extracted (step ST14: Y), the second image processing section 26 decides to adopt a result of extraction by the difference-image fingertip extraction process (step ST15), and outputs a final result to the device controller 3 (step ST17).

Meanwhile, if it is determined that the fingertip has not been extracted (step ST14: N), the second image processing section 26 decides to adopt a result of extraction by the shadow-image fingertip extraction process (step ST16), and outputs a final result to the device controller 3 (step ST17).

As described above, regarding image processing (including both hardware and software processing) according to the present embodiment, the difference-image fingertip extraction process is performed as a main process, and the shadow-image fingertip extraction process is performed as a subordinate process. Then, while both extraction processes are taken into account, the result of extraction by one of the extraction processes is selected finally.

Next, the details of the difference-image fingertip extraction process and the shadow-image fingertip extraction process will now be described below.

Figure 13:
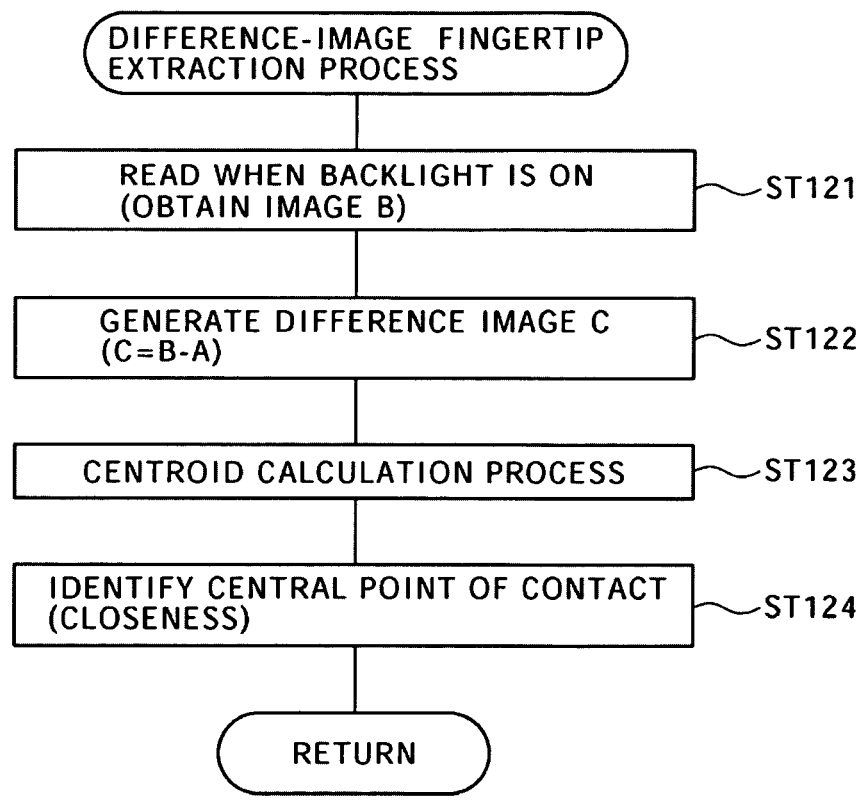
FIG. 13 is a flowchart illustrating details of a difference-image fingertip extraction process as shown in FIG. 12.

First, the details of the difference-image fingertip extraction process will be described with reference to FIGS. 13 to 18. FIG. 13 is a flowchart illustrating the details of the difference-image fingertip extraction process.

As described above, the I/O display panel 20 performs the process of imaging the adjacent object during the second half (i.e., the light period) of the one display frame period, in which the backlight 21 is in the On state, so that the image B (i.e., the display-light-using image) is obtained (step ST121 in FIG. 13, FIG. 12).

Next, the second image processing section 26 generates the difference image C, which is the difference between the image B and the image A (i.e., the shadow image), which is obtained by imaging during the period (i.e., the dark period) in which the backlight 21 is in the Off state (step ST122).

Then, the second image processing section 26 performs a computation process of determining a centroid of the generated difference image (step ST123), and identifies a central point of contact (closeness) (step ST124).

As described above, in the difference-image fingertip extraction process, the process of extracting the fingertip is performed based on the difference image C, which is the difference between the image B, which is taken using the display light, and the image A, which is taken using the ambient light without using the display light. Accordingly, as shown by an exemplary picture image of the difference image C as shown in FIG. 14, the adjacent object is detected such that influence of the brightness of the ambient light is eliminated.

Specifically, suppose that incident ambient light is strong as illustrated in a cross section of FIG. 15A, for example. In this case, as shown in FIG. 15B, a light-receiving output voltage Von1 in a situation where the backlight 21 is illuminated has a voltage value Va at positions where the finger is not in contact with the display area 201 of the panel and a reduced voltage value Vb at positions where the finger is in contact with the display area 201 of the panel. The voltage value Va corresponds to the brightness of the ambient light, while the voltage value Vb corresponds to reflectance of the object (finger) that is in contact with the display area 201 of the panel, the object reflecting the light coming from the backlight. In contrast, a light-receiving output voltage Voff1 in a situation where the backlight 21 is not illuminated has the voltage value Va at the positions where the finger is not in contact with the display area 201 of the panel and a voltage value Vc at the positions where the finger is in contact with the display area 201 of the panel. The voltage value Vc is very low because the ambient light is blocked by the finger at the positions where the finger is in contact with the display area 201 of the panel.

Suppose that the incident ambient light is very weak (or there is almost no incident ambient light) as illustrated in a cross section of FIG. 16A. In this case, as shown in FIG. 16B, a light-receiving output voltage Von2 in the situation where the backlight 21 is illuminated has a very low voltage value Vc at the positions where the finger is not in contact with the display area 201 of the panel (because there is almost no ambient light) and an increased voltage value Vb at the positions where the finger is in contact with the display area 201 of the panel. The voltage value Vb corresponds to the reflectance of the object (finger) that is in contact with the display area 201 of the panel, the object reflecting the light coming from the backlight. In contrast, a light-receiving output voltage Voff2 in the situation where the backlight 21 is not illuminated has the very low voltage value Vc throughout.

As is apparent from FIGS. 15A and 15B and FIGS. 16A and 16B, at the positions where the finger is not in contact with the display area 201 of the panel, the light-receiving output voltage differs greatly depending on whether there is the ambient light. On the other hand, at the positions where the finger is in contact with the display area 201 of the panel, the light-receiving output voltage is significantly the same regardless of whether there is the ambient light. That is, in both the case where there is the ambient light and the case where there is not the ambient light, at the positions where the finger is in contact with the display area 201 of the panel, the light-receiving output voltage has the voltage value Vb when the backlight is illuminated, and the voltage value Vc when the backlight is not illuminated.

Accordingly, by detecting a difference between a voltage when the backlight 21 is illuminated and a voltage when the backlight 21 is not illuminated, it is possible to detect a point at which the finger is in contact with or close to the display area 201 of the panel. For example, a difference between the voltage value Vb and the voltage value Vc is large. A point at which such a large voltage difference occurs can be identified as a point at which the finger is in contact with or close to the display area 201 of the panel. Thus, regardless of whether the ambient light incident on the panel is strong or whether there is almost no ambient light, the contact or closeness of the finger can equally be detected excellently.

Figure 17A:
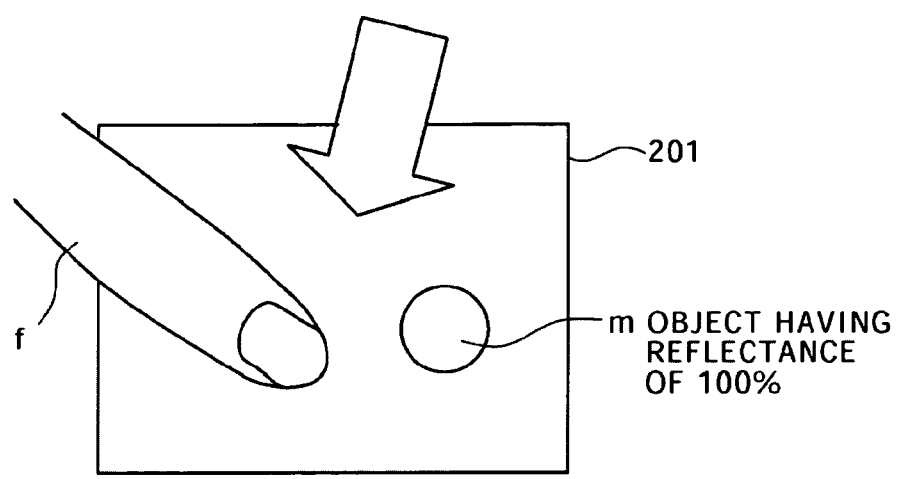
FIGS. 17A and 17B are diagrams for describing a dynamic range of a light-receiving signal obtained by the difference-image fingertip extraction process.
Figure 17B:
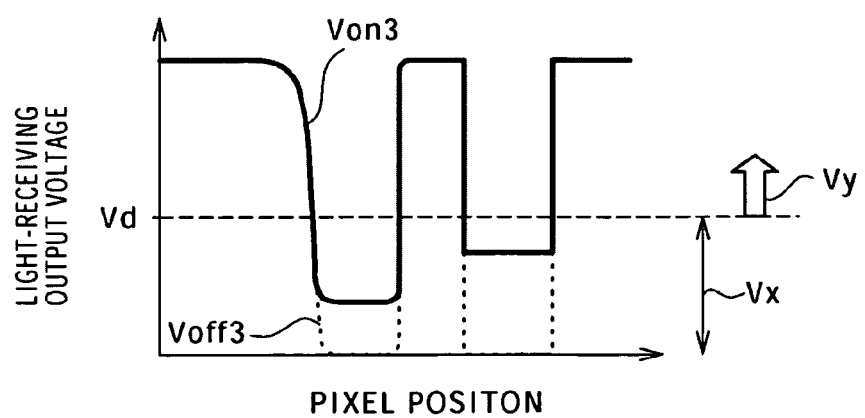
Figure 18A:
FIGS. 18A to 18D show images for describing the difference-image fingertip extraction process when there are a plurality of fingertips to be detected at the same time.
Figure 18B:
Figure 18C:
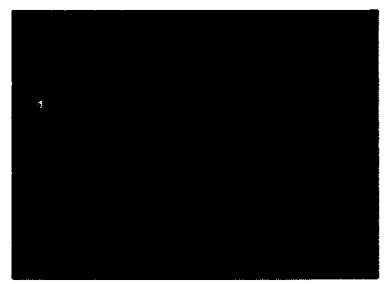
Figure 18D:

As shown in FIGS. 17A and 17B, a dynamic range necessary for the detection of the light-receiving output voltage is determined as follows. FIG. 17A shows the display area 201 of the panel, a finger f, and a circular object m. The finger f is in contact with the surface of the panel, and the circular object m, whose reflectance is almost 100%, is placed on the display area 201. FIG. 17B shows a light-receiving output voltage on a line on which both the finger f and the object m exist, in the situation as shown in FIG. 17A. In FIG. 17B, a voltage Von3 represents the light-receiving output voltage in the situation where the backlight is illuminated, and a voltage Voff3 represents the light-receiving output voltage in the situation where the backlight is not illuminated.

Referring to FIG. 17B, voltage values (denoted as Vy) that are greater than a voltage value Vd, which is detected at positions where the object m, whose reflectance is almost 100%, is placed when the backlight is illuminated, do not need to be measured. A range Vx of voltage values below those voltage values Vy is the dynamic range necessary for detection. Therefore, the voltage values Vy, which do not need to be measured, may be regarded as having the same value.

As is apparent from images (which correspond to the images A to C and a two-level image of the image C, respectively) as shown in FIGS. 18A to 18D, in the difference-image fingertip extraction process, it is also possible to obtain information concerning the position, shape, size, or the like of a plurality of objects that are in contact with or close to the display area 201 of the I/O display panel 20 at the same time.

Figure 19:
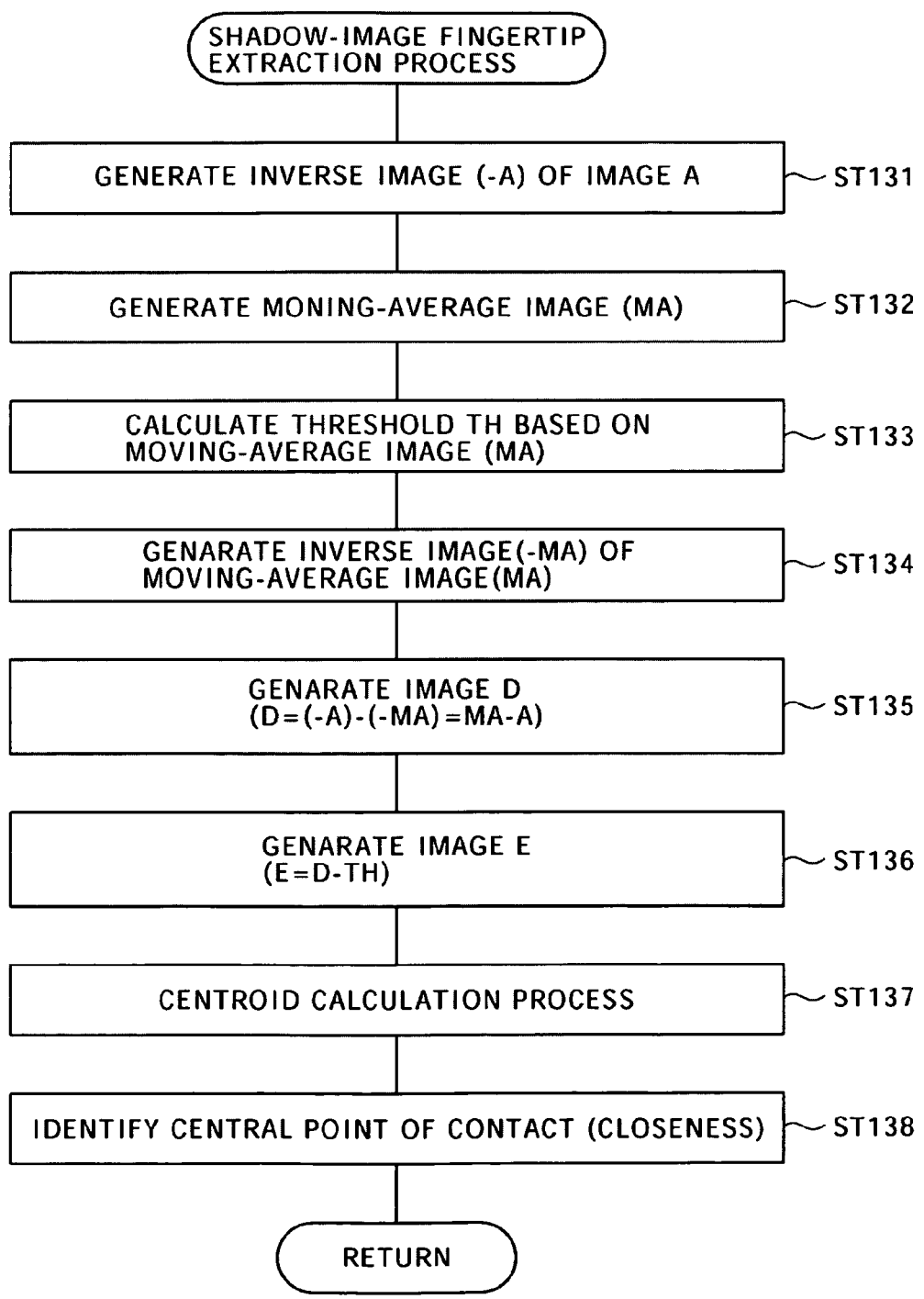
FIG. 19 is a flowchart illustrating details of a shadow-image fingertip extraction process as shown in FIG. 12.
Figure 20:
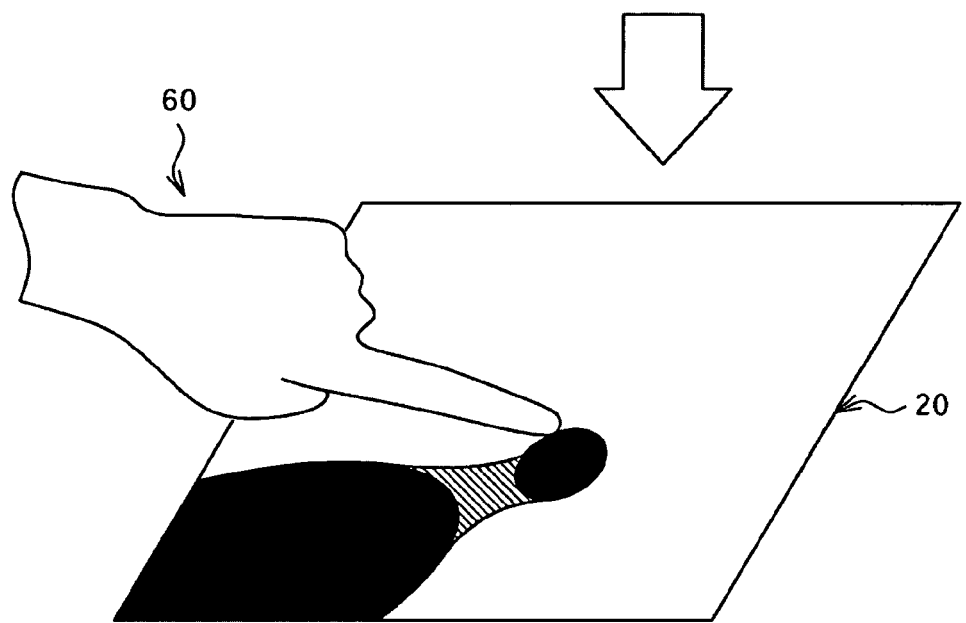
FIG. 20 is a perspective illustration for describing a concept of the shadow-image fingertip extraction process.

Next, the details of the shadow-image fingertip extraction process will now be described below with reference to FIGS. 19 to 26. FIG. 19 is a flowchart illustrating the details of the shadow-image fingertip extraction process. FIG. 20 is a perspective view of a situation at the time when the shadow-image fingertip extraction process is performed.

First, the first image processing section 25 or the second image processing section 26 generates an inverse image (−A) of the image A (i.e., the shadow image) previously obtained (step ST131). In addition, the first image processing section 25 or the second image processing section 26 generates a moving-average image MA of the original image A (step ST132).

Figure 21:
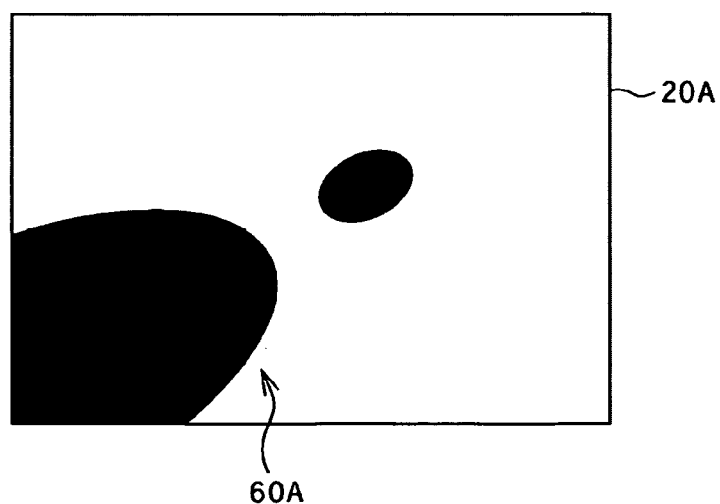
FIG. 21 is a schematic illustration showing an example of an image obtained by the shadow-image fingertip extraction process.
Figure 24A:
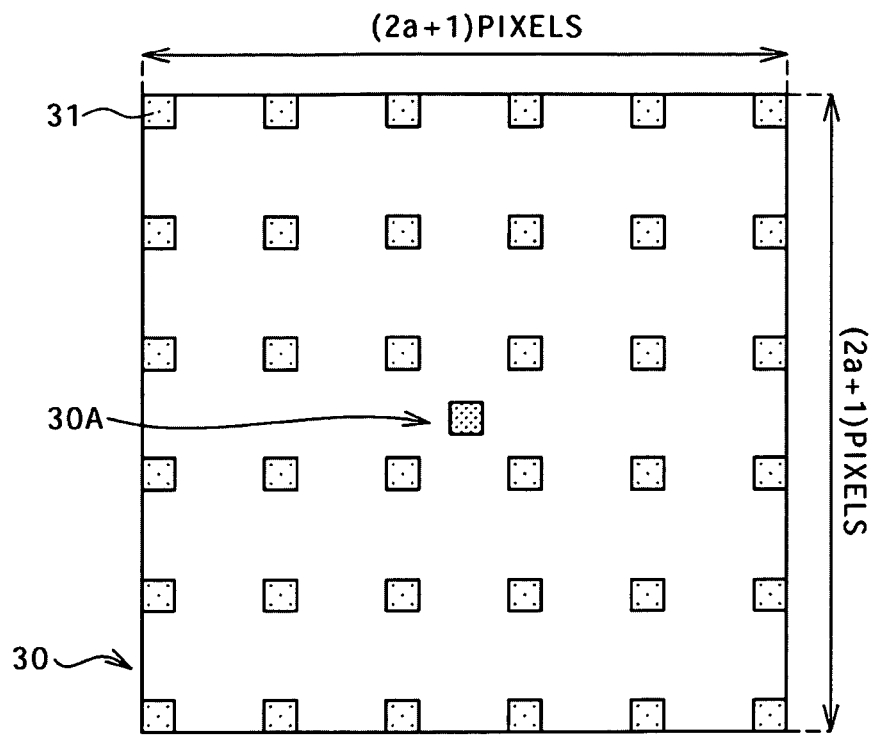
FIGS. 24A, 24B, 25, and 26 are diagrams for describing a process of generating a moving-average image.
Figure 24B:
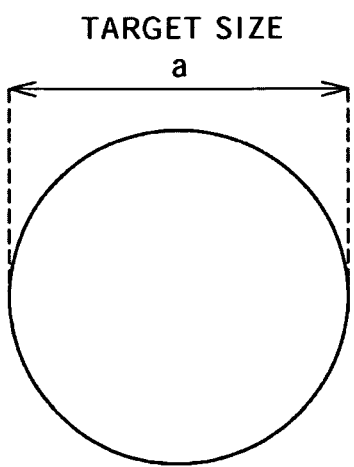
Figure 25:
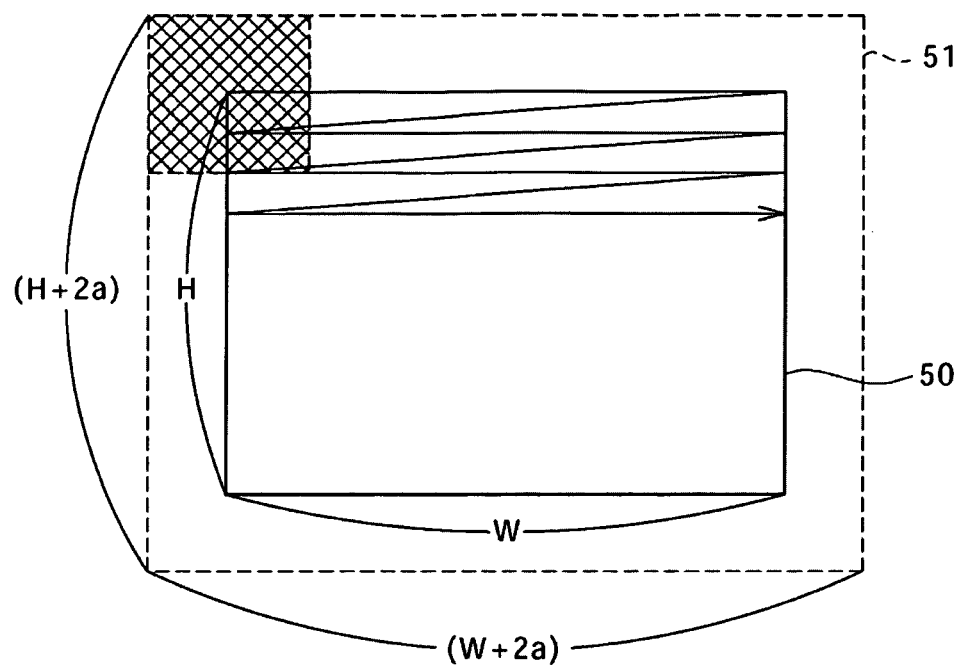
Figure 26:
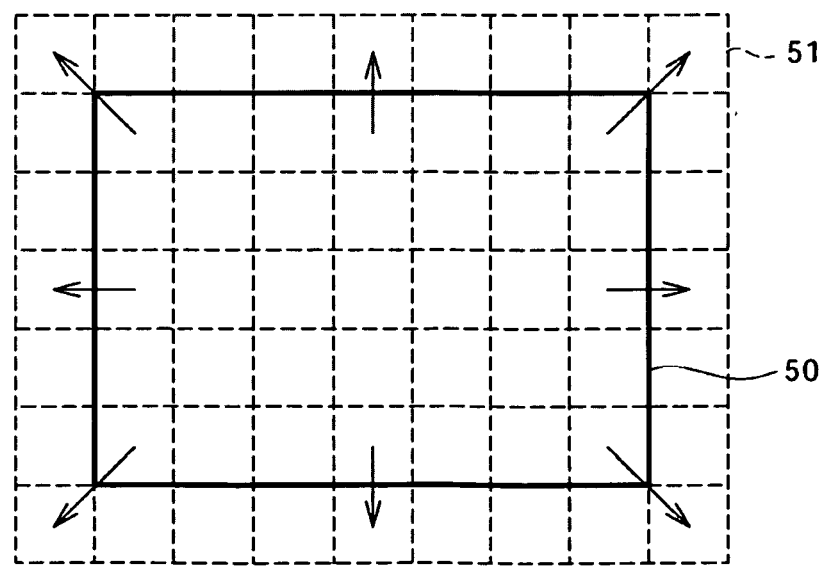

The moving-average image MA is generated in the following manner. As shown in FIG. 24A, for example, a process (hereinafter referred to as a "leveling computation process" as appropriate) of leveling pixel data is performed on a pixel area 30, which is composed of one pixel 30A, on which a focus is placed, and its surrounding pixels in the image A (in this case, the pixel area 30 is composed of (2a+1)×(2a+1) pixels). As shown in FIG. 25, for example, the leveling computation process is performed with respect to the entire image taken, while the focus is shifted from one pixel to another. A result of the leveling computation process performed on one pixel area is reflected in the leveling computation process performed on the next pixel area, which includes the pixel on which the focus is placed next. Preferably, the size (in this case, (2a+1) pixel×(2a+1) pixel) of a pixel area 30 on which the leveling computation process is performed is set based on an expected size (i.e., a target size a) of the object to be detected (for example, the size of the pixel area 30 may be set at approximately the target size a). This is because setting the size of the pixel area in such a manner results in prevention of detection of a first part (denoted by reference numeral "60A"), as happens with image 20A (which corresponds to image D or image E, which will be described later) as shown in FIG. 21, for example. A detailed description will be presented later. Note that, as shown in FIG. 26, for example, as pixel data of an area 51 outside of an area 50, which is necessary for the leveling computation process, a copy of pixel data of a periphery of the area 50 may be applied, for example.

Next, the first image processing section 25 or the second image processing section 26 calculates a threshold TH, which will be used later (at step ST136), based on the moving-average image MA (step ST133). Specifically, the first image processing section 25 or the second image processing section 26 calculates the threshold TH based on pixel data of a pixel that is the brightest (i.e., pixel data having the largest size) in the moving-average image MA and pixel data of a pixel that is the darkest (i.e., pixel data having the smallest size) in the original image A. For example, the first image processing section 25 or the second image processing section 26 calculates the threshold TH by taking an average of the above two pieces of pixel data Note that an average of pixel data of pixels at the four corners of the display area 201 may be used as the pixel data of the brightest pixel (i.e., the pixel data having the largest size), as it is very unlikely that adjacent objects be arranged at the four corners of the display area 201 at the same time.

Next, the second image processing section 26 generates an inverse image (−MA) of the generated moving-average image MA (step ST134), and generates difference image D, which is a difference between the inverse image (−A) of the original image A and the inverse image (−MA) of the moving-average image MA (step ST135). The difference image D is a difference between the moving-average image MA and the original image A: D=(−A)−(−MA)=MA−A. Then, the second image processing section 26 generates the image E (=D−TH) by subtracting the threshold TH calculated at step ST133 from each piece of pixel data in the image D (step ST136).

Figure 22:
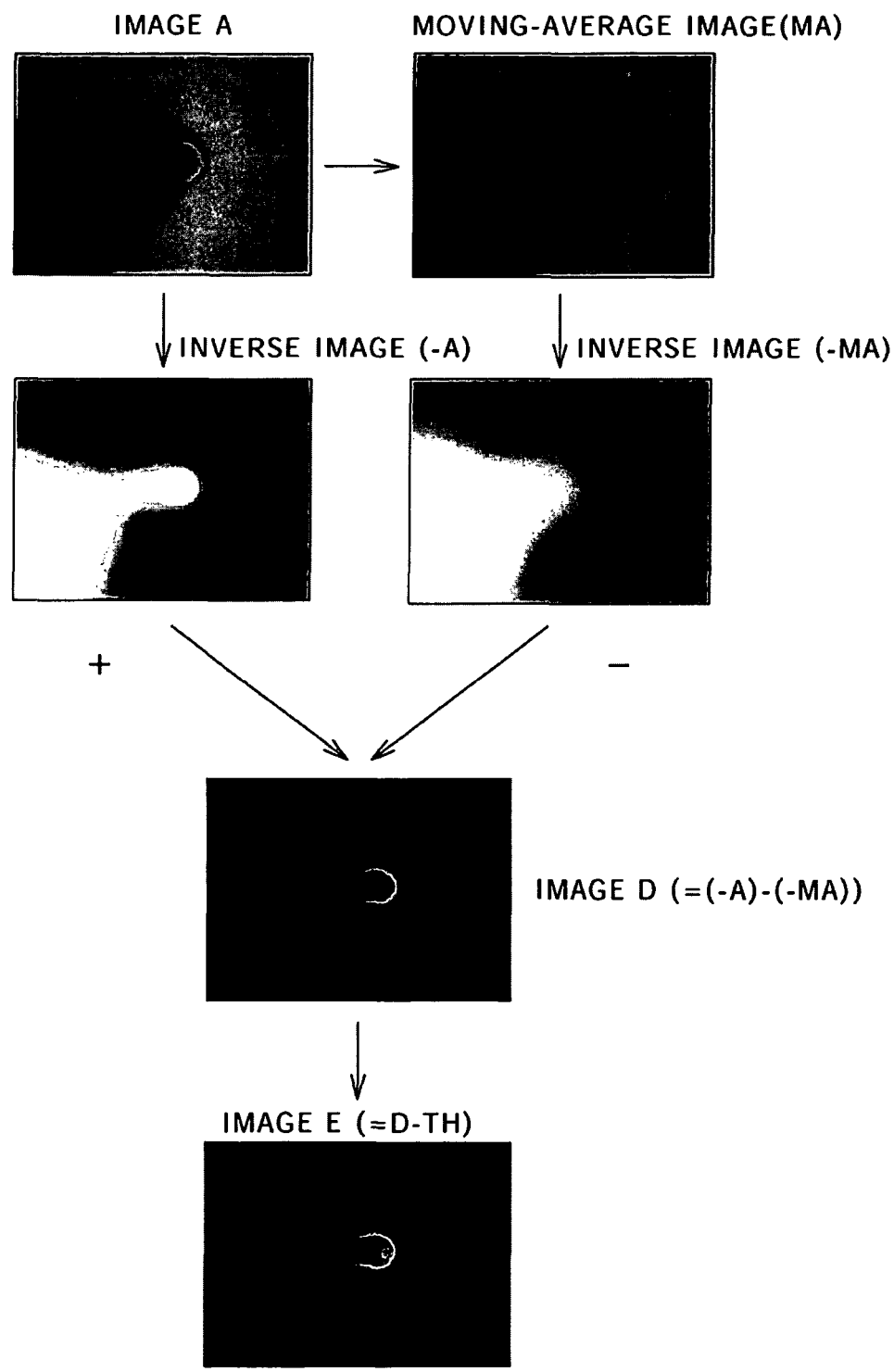
FIG. 22 shows images for describing the shadow-image fingertip extraction process.
Figure 23:
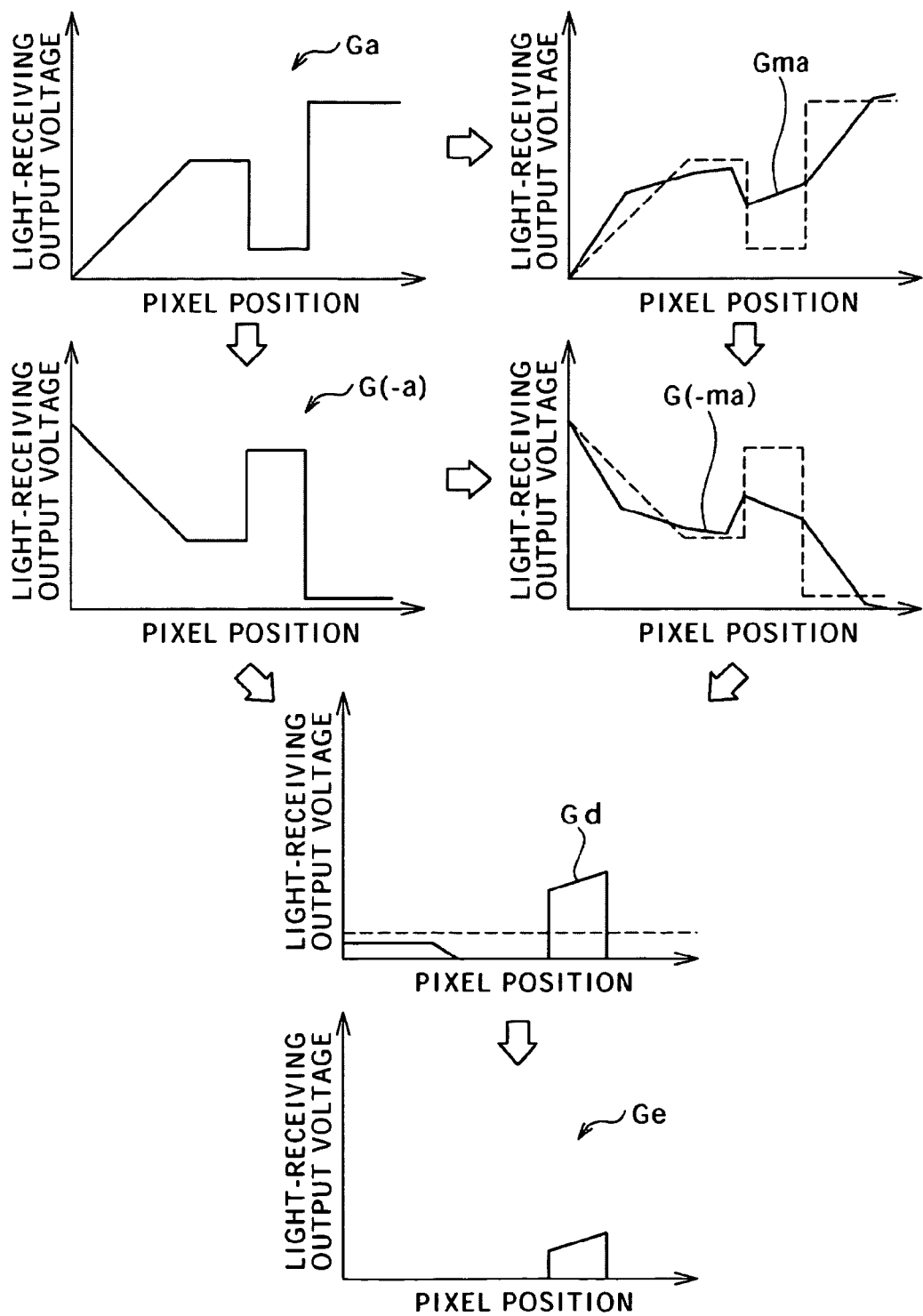
FIG. 23 shows diagrams for describing a light-receiving signal obtained by the shadow-image fingertip extraction process.

Here, as in images D and E as shown in FIG. 22 and exemplary light-receiving output voltage waveforms Gd and Ge in images D and E as shown in FIG. 23, the fingertip part, whose size is significantly the same as the target size a, is detected while the first part, which is larger than the fingertip, is not detected. Note that exemplary light-receiving output voltage waveforms Ga, G(−A), Gma, and G(−MA) as shown in FIG. 23 correspond to examples of light-receiving output voltage waveforms in the original image A, the inverse image thereof (−A), the moving-average image MA, and the inverse image thereof (−MA), respectively.

Next, based on the image E, the second image processing section 26 performs a centroid calculation process (step ST137) and a process of identifying the central point of contact (closeness) (step ST138), in a similar manner to that in the above-described difference-image fingertip extraction process.

As described above, in the shadow-image fingertip extraction process, the process of extracting the fingertip is performed based on the difference image D, which is the difference between the moving-average image MA of the image A, taken using the ambient light, and the original image A. Thus, as described above, the object whose size is significantly the same as the target size is detected, and the adjacent object can be detected even when the display light is not emitted (for example, when the backlight 21 is constantly in the Off state as in the case where the liquid crystal elements, which are the display elements, are translucent liquid crystal elements and the I/O display panel 20 is used outdoors, or when a black image is being displayed on the I/O display panel 20).

Note that, in this shadow-image fingertip extraction process as well as in the difference-image fingertip extraction process, it is possible to obtain information concerning the position, shape, size, or the like of a plurality of objects that are simultaneously in contact with or close to the display area 201 of the I/O display panel 20.

In the display apparatus according to the present embodiment, while both the difference-image fingertip extraction process and the shadow-image fingertip extraction process described above are taken into account, a result of the detection of the adjacent object obtained by one of the two processes is outputted as the final result from the second image processing section 26 to the device controller 3.

FIG. 27 shows characteristics of the difference-image fingertip extraction process and the shadow-image fingertip extraction process. In FIG. 27, "excellent" indicates that the corresponding fingertip extraction process is excellent at fingertip extraction under the corresponding condition, "conditional" indicates that the corresponding fingertip extraction process is sometimes excellent and sometimes poor at fingertip extraction depending on the situation under the corresponding condition, and "poor" indicates that the corresponding fingertip extraction process is poor at fingertip extraction in principle under the corresponding condition. As is apparent from FIG. 27, when it is bright in surroundings, the difference-image fingertip extraction process is the more excellent at fingertip extraction, and therefore the result of extraction obtained by the difference-image fingertip extraction process is presumably adopted. When the backlight 21 is not illuminated and the display light is not emitted, or when the display panel is in a black state, the difference-image fingertip extraction process may sometimes fail in fingertip extraction, and in that case, the result of extraction obtained by the shadow-image fingertip extraction process is presumably adopted.

Next, referring to FIGS. 28A to 31, several examples of how the device controller 3 executes an application program using the information concerning the position or the like of the object detected by the fingertip extraction process as described above will now be described below.

Figure 28A:
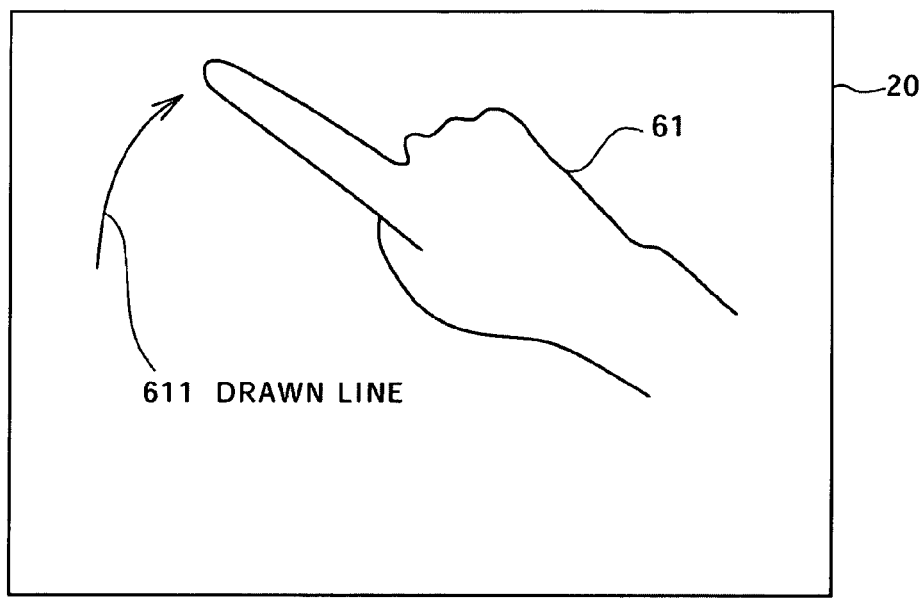

In an example as shown in FIG. 28A, a user touches the surface of the I/O display panel 20 with a fingertip 61, and a track of the fingertip on the surface of the I/O display panel 20 is displayed on a screen as a drawn line 611.

Figure 28B:
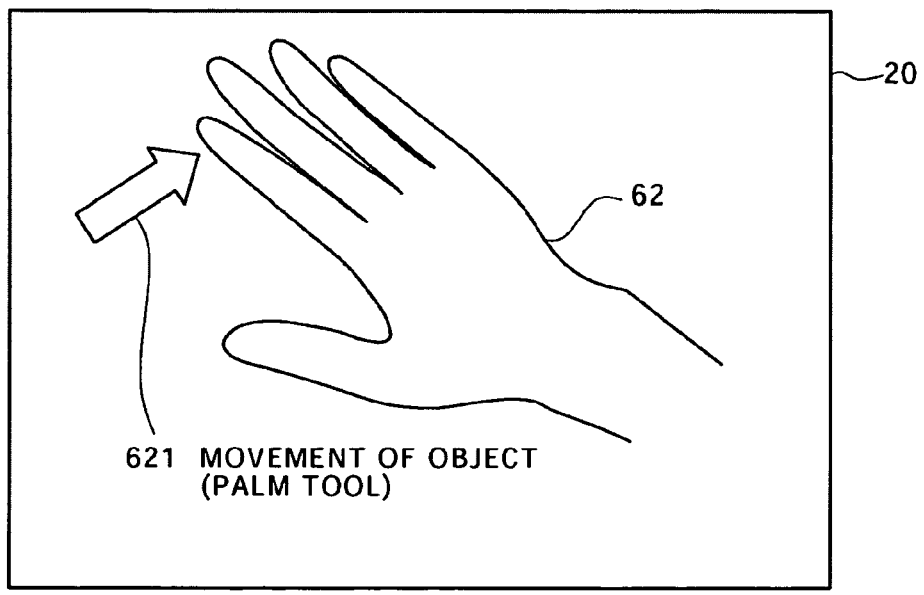

An example as shown in FIG. 28B is an example in which a gesture using the shape of a hand is recognized. Specifically, the shape of a hand 62 that is in contact with (or close to) the I/O display panel 20 is recognized, an image representing the shape of the hand recognized is displayed, and some processing is performed in accordance with movement 621 of that object displayed.

An example as shown in FIG. 29 is an example in which a hand 63A in a closed state is changed to a hand 63B in an open state, contact or closeness of the hand in the respective states is recognized by the I/O display panel 20 by image recognition, and processing is performed based on a result of the image recognition. For example, issuance of an instruction for zooming in is achieved by processing based on such recognition. In addition, because issuance of such an instruction is possible in such a manner, an operation for switching commands on a personal computer connected to the I/O display panel 20 can be entered in a more natural manner by such image recognition, for example.

Further, as shown in FIG. 30, for example, a plurality of I/O display panels 20 may be prepared and connected with each other via some transmission medium, and an image obtained in one I/O display panel by detecting contact or closeness of an object may be transmitted to the other I/O display panel and displayed on the other I/O display panel, so that users that operate the respective display panels can communicate with each other. That is, as shown in FIG. 30, two I/O display panels may be prepared, and a shape 65 of a hand recognized by one of the panels by image recognition may be transmitted to the other panel so that a shape 642 of the hand is displayed on the other panel. Also, a track 641 of a hand 64 on the latter panel, which is displayed, may be transmitted to and displayed on the former panel, for example. As described above, a video representing an act of drawing may be transferred from one panel to another, so that a handwritten character, figure, or the like is sent to the other party. This may lead to realization of a new communication tool. Such an example is conceivable when the I/O display panel 20 is applied to a display panel in a mobile phone terminal, for example.

Figure 31:
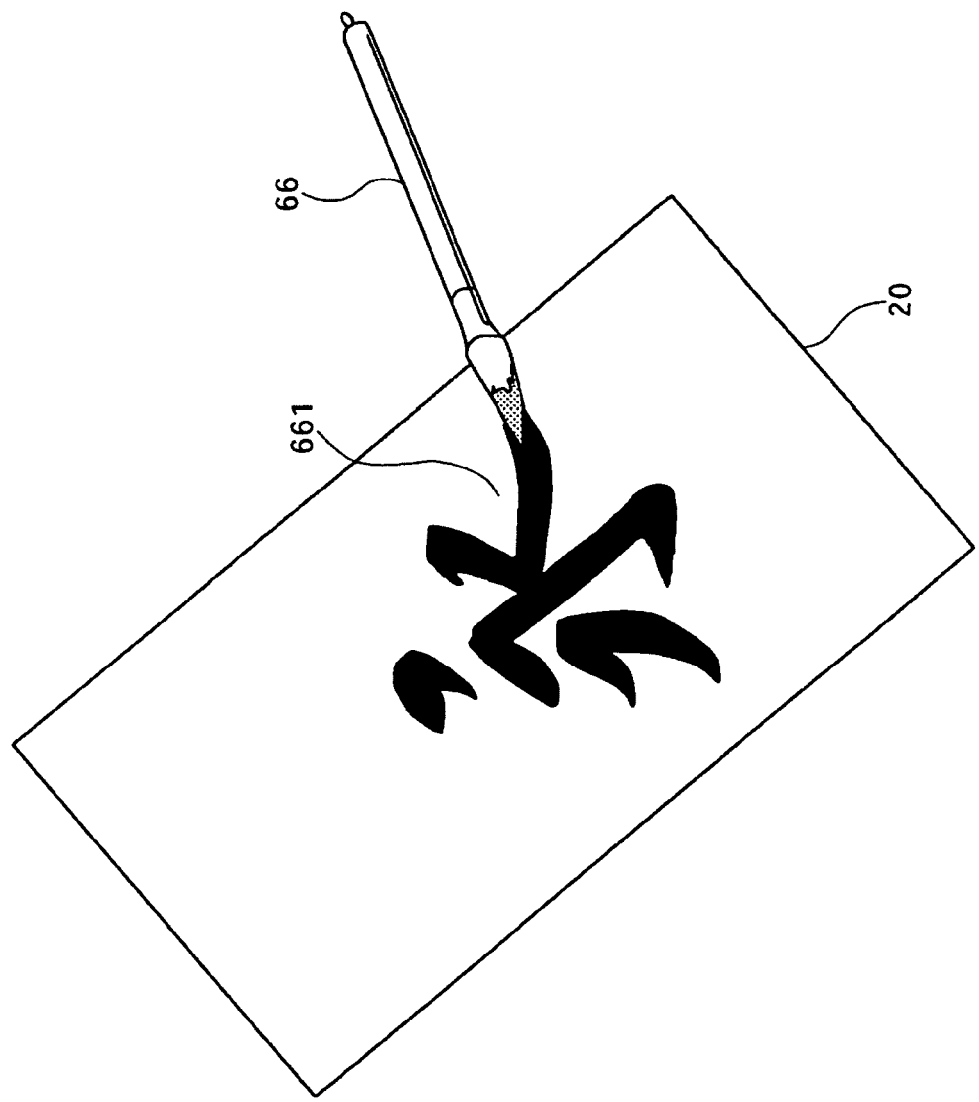

Still further, as shown in FIG. 31, for example, a character may be written on the surface of the I/O display panel 20 with a writing brush 66, and a track of the writing brush 66 on the surface of the I/O display panel 20 may be displayed on the I/O display panel 20 as an image 661. In this manner, entering of the handwritten character is achieved using the writing brush. In this case, it is possible to recognize and reproduce even delicate touches of the writing brush. In common handwriting recognition, such as in some digitizers, a tilt of a special pen is recognized by electric field detection. In this example, however, a touch of the real writing brush is detected, and therefore, information input can be performed with a greater sense of reality.

As described above, in the present embodiment, the difference image C, which is the difference between the image B (i.e., the display-light-using image) obtained by imaging the adjacent object using the display light and the image A (i.e., the shadow image) obtained by imaging a shadow of the adjacent object is generated, and information concerning at least one of the position, shape, and size of the adjacent object is detected while the image A (i.e., the shadow image) and the difference image C are taken into account. Therefore, it is possible to detect the object regardless of a usage situation at the time, such as a surrounding situation, the brightness of the display light, or the like.

Moreover, the moving-average image MA is generated based on the image A, and the object is detected using the difference image D, which is the difference between the moving-average image MA and the original image A, and the image E, which is obtained by subtracting the threshold TH from each piece of pixel data in the difference image D. In addition, the size of the pixel area 30 at the time of the leveling computation process is set at approximately the expected size (i.e., the target size) of the object to be detected. Therefore, the fingertip part, whose size is significantly the same as the target size, can be detected while the first part, which is larger than the fingertip, is not detected, for example. Thus, the degree of precision of the detection process is improved.

Moreover, within one operation period (i.e., one display frame period), the image A (i.e., the shadow image) is obtained earlier than the image B (i.e., the display-light-using image). Therefore, a time for computing the moving-average image MA, the computation of which takes a long time, can be secured before performing the difference-image fingertip extraction process, as shown in FIG. 12, for example. Thus, the time necessary for the entire process is reduced compared to the case where the image B is obtained earlier than the image A.

Note that, in the present embodiment, the difference-image fingertip extraction process is the main process, and the shadow-image fingertip extraction process is the subordinate process. However, in another embodiment of the present invention, the difference-image fingertip extraction process and the shadow-image fingertip extraction process may be performed as the subordinate process and the main process, respectively.

[Second Embodiment]

Figure 10:
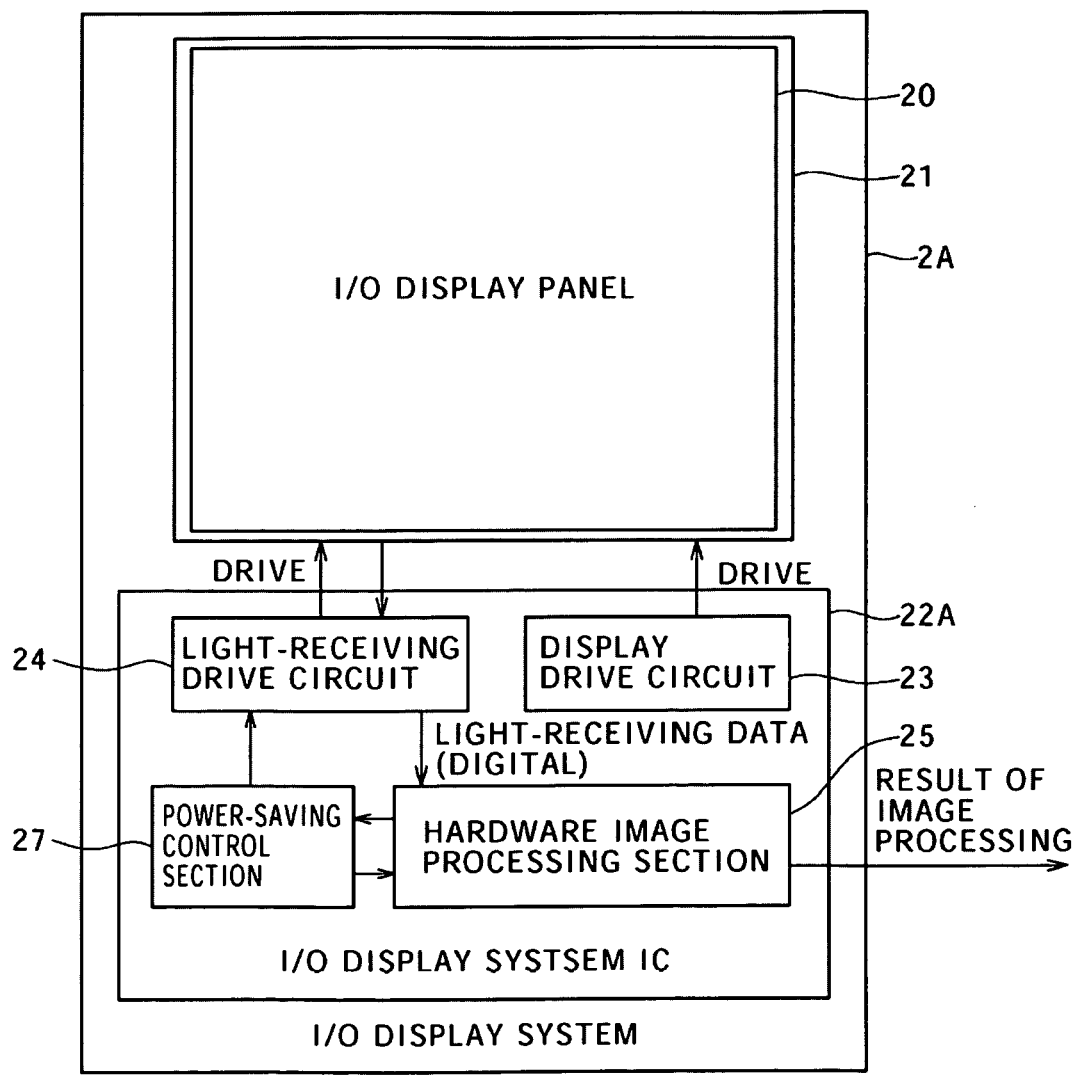
FIG. 10 is a block diagram illustrating an overall structure of a portable display apparatus according to a second embodiment.

FIG. 10 is a block diagram illustrating an overall structure of a portable display apparatus according to a second embodiment of the present invention.

In the I/O display system 2 in the display apparatus 1 as shown in FIG. 1, the system for the panel includes the MPU or software that computes the coordinates and area based on the image in which the fingertip is made bright by hardware processing. The device controller 3 performs an operation based on information of the coordinates and area. In this case, a burden on the controller is relatively light.

On the other hand, in an I/O display system 2A in a display apparatus 1A as shown in FIG. 10, the system for the panel does not include the MPU or software that computes the coordinates and area, while the system includes a judging circuit that judges whether the fingertip is close to the panel based on the image in which the fingertip is made bright by hardware processing. The subsequent computation of the coordinates and area is performed by the device controller 3. In this case, the reduction in the power consumption is achieved by changing an operation interval of the sensors in the panel. Information of whether or not the fingertip is close to the panel and the result of image processing are supplied from the panel system to the device controller 3.

As described above, it is possible to slightly change a hardware structure depending on the device to which the embodiment of the present invention is applied. Further, it is possible to choose whether to give priority to reduction in the power consumption or quickness of reaction.

[Third Embodiment]

Next, a third embodiment will be described. In a display/imaging apparatus according to the present embodiment, one of the difference-image fingertip extraction process and the shadow-image fingertip extraction process is selected based on a predetermined criterion, and the fingertip extraction process is performed based on the selected image. The third embodiment is similar to the first embodiment in the other respects and operation, and therefore, descriptions thereof will be omitted as appropriate.

Figure 32:
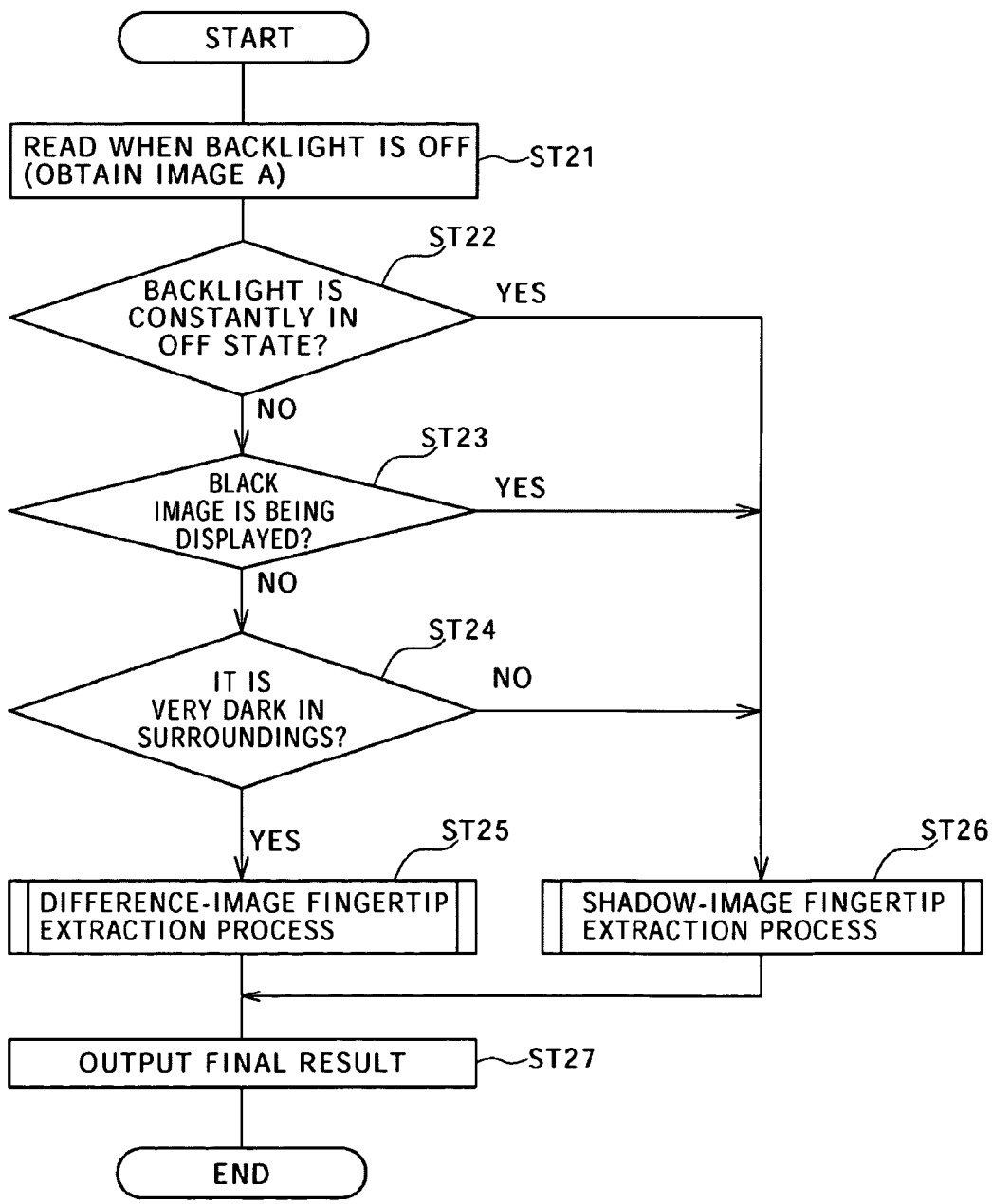
FIG. 32 is a flowchart illustrating a fingertip extraction process according to a third embodiment.

FIG. 32 is a flowchart illustrating a fingertip extraction process according to the present embodiment. As shown in FIG. 32, after the image A (i.e., the shadow image) is obtained (step ST21) in the same manner as in the above-described embodiment, the second image processing section 26 selectively performs one of the two processes that ensures secure performance of the fingertip extraction process depending on the situation (steps ST22 to ST26, see the comparative table of FIG. 27).

Specifically, when the backlight is constantly in the Off state, when the black image is being displayed, or when it is not dark in the surroundings, the shadow-image fingertip extraction process is selectively performed (step ST26), and the final result is outputted (step ST27). It is determined based on the size of the pixel data in the image A (i.e., the shadow image) whether or not it is dark in the surroundings. When the size of the pixel data is very small, it is determined that it is very dark in the surroundings.

Meanwhile, when the backlight is not constantly in the Off state, the black image is not being displayed, and it is very dark in the surroundings, the difference-image fingertip extraction process is selectively performed (step ST25), and the final result is outputted (step ST27).

As described above, in the present embodiment, one of the difference-image fingertip extraction process and the shadow-image fingertip extraction process is selected based on the predetermined criterion, and the fingertip extraction process is performed based on the selected image. Therefore, the appropriate one of the two fingertip extraction processes can be applied to ensure secure performance of the extraction process in a greater variety of usage situations.

[Fourth Embodiment]

Next, a fourth embodiment will be described. In a display/imaging apparatus according to the present embodiment, as shown in FIGS. 2 and 3, the first image processing section 25 performs both the difference-image fingertip extraction process and the shadow-image fingertip extraction process in any case, and the fingertip extraction process is performed using a combined image of the image A (i.e., the shadow image) and the difference image C. The fourth embodiment is similar to the first embodiment in the other respects and operation, and therefore, descriptions thereof will be omitted as appropriate.

Figure 33:
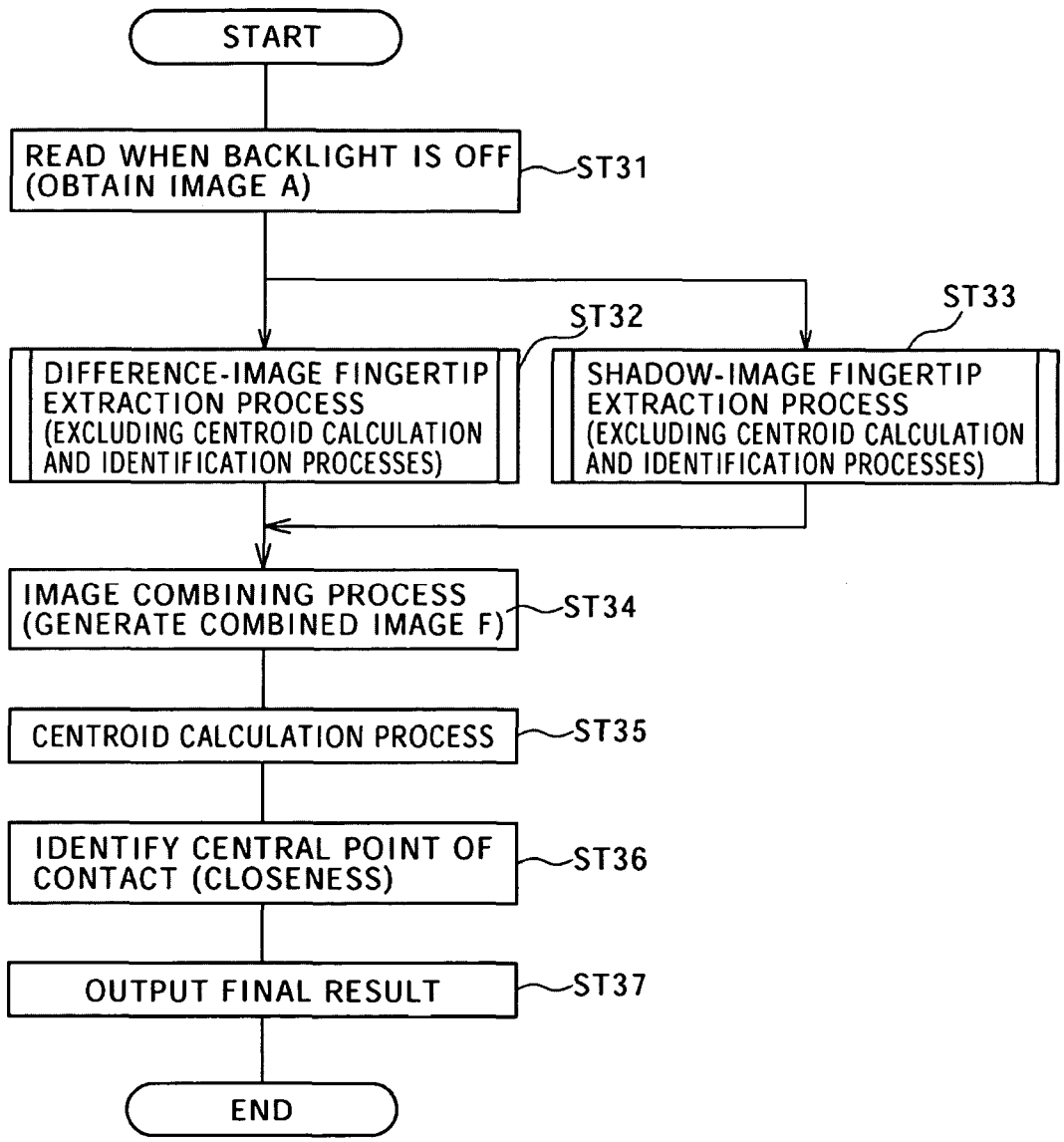
FIG. 33 is a flowchart illustrating a fingertip extraction process according to a fourth embodiment.

FIG. 33 is a flowchart illustrating a fingertip extraction process according to the present embodiment. As shown in FIG. 33, after the image A (i.e., the shadow image) is obtained (step ST31) in the same manner as in the first embodiment, both the difference-image fingertip extraction process and the shadow-image fingertip extraction process are performed (steps ST32 and ST33), while neither the centroid calculation process nor the process of identifying the central point of contact (closeness) is performed.

Next, as shown in FIG. 34, for example, a combined image F (=α×C+E) of the difference image C, which is generated by the difference-image fingertip extraction process, and the image E, which is generated by the shadow-image fingertip extraction process, is generated (step ST34). Note that a is a predetermined weighting coefficient.

Then, as in the above-described embodiment, the second image processing section 26 performs the centroid calculation process (step ST35), the process of identifying the central point of contact (closeness) (step ST36), and the process of outputting the final result (step ST37).

As described above, in the present embodiment, both the difference-image fingertip extraction process and the shadow-image fingertip extraction process are performed in any case, and the combined image F (=α×C+E) of the difference image C, which is generated by the difference-image fingertip extraction process, and the image E, which is generated by the shadow-image fingertip extraction process, is generated, and the fingertip extraction process is performed based on the combined image F. Therefore, as shown in FIG. 34, for example, a clearer image of the fingertip or the like can be detected, and the extraction process can be performed more securely.

The present application has been described above according to an embodiment. Note, however, that the present application is not limited to these embodiments, and that various variations are contemplated.

Figure 35A:
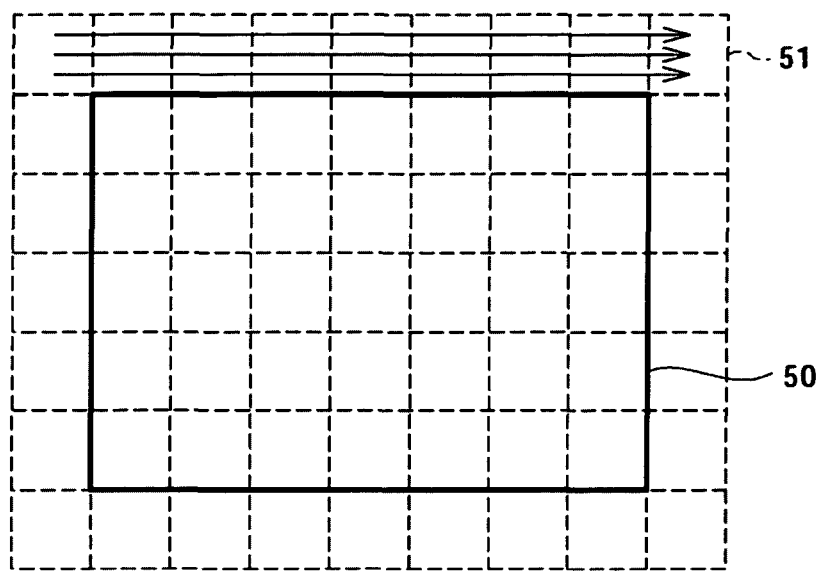
FIGS. 35A and 35B are diagrams for describing a process of generating the moving-average image according to another embodiment.
Figure 35B:
Figure 36A:
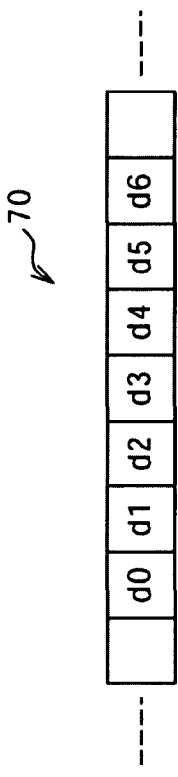
FIGS. 36A and 36B are diagrams for describing a process of generating the moving-average image according to yet another embodiment.
Figure 36B:
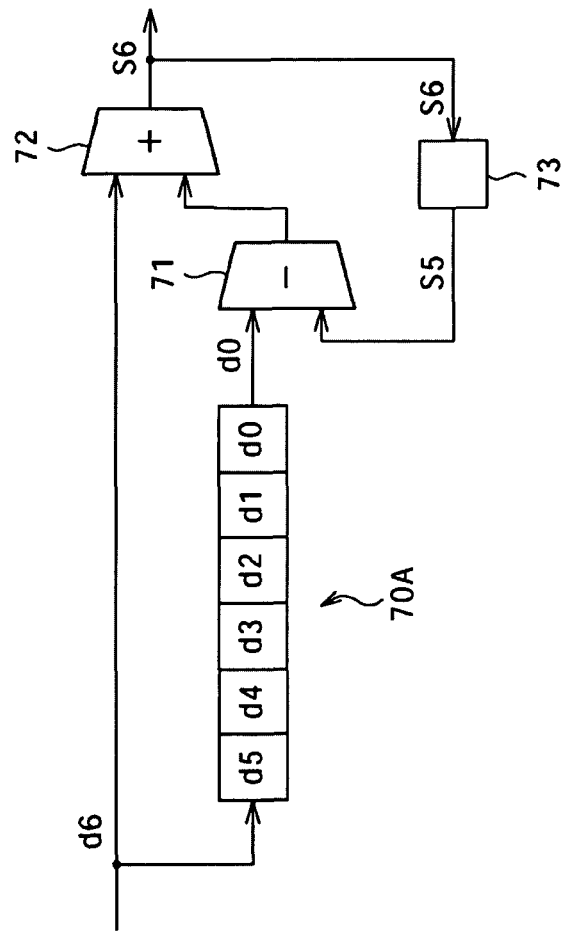

For example, in the process of generating the moving-average image in one embodiment of the present application, the leveling computation process may be performed while target pixels are selectively reduced, so that the amount of processing is reduced. For example, as shown in FIGS. 35A and 35B, while the focus is first shifted from one pixel to another in a pixel direction which is adjacent to the focused pixel, the leveling computation process may be performed on pixels on this direction, and thereafter, while the focus is shifted from one pixel to another in the other pixel direction which is adjacent to the focused pixel, the leveling computation process may be performed on pixels on this other direction. Also, a dot adding process in a predetermined direction may be performed using operation circuits 70 to 73 as shown in FIGS. 36A and 36B, for example.

In the above-described embodiment, by generating the moving-average image MA based on the original image A, and setting the size of the pixel area 30 at the time of this moving-average computation process based on the expected size (i.e., the target size a) of the object to be detected, one that is larger than the pixel area 30, i.e., pixel data (a fingertip image, in this case) that has a higher spatial frequency than the pixel area 30, is removed in the moving-average image MA, and by taking the difference between this moving-average image MA and the original image A, pixel data (the shadow image, in this case) that has a lower spatial frequency than the pixel area 30 is finally removed, so that the pixel data (the fingertip image, in this case) that has a high spatial frequency is extracted. That is, in the above-described embodiment, as an example of such a high-pass filter and a method that realizes the simplest and fastest processing, the method of taking the difference between the moving-average image MA and the original image A has been described. The present invention is not limited to use of the method described above. Alternatively, another high-pass filter may be used to perform both low-pass filter processing and difference processing at a time.

In the above-described embodiments, the display elements in the I/O display panel 20 are the liquid crystal elements, and the light-receiving elements are provided independently of the display elements. Note, however, that the I/O display panel may be provided with light-emitting/light-receiving elements (display/imaging elements), such as organic electro-luminescence (EL) elements, that are capable of performing a light-emitting operation and a light-receiving operation at separate times. In this case also, similar effects to those achieved by the above-described embodiments are achieved. Note that, in this case, a period in which the display light is not emitted corresponds to a period in which the display/imaging elements are not performing the light-emitting operation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus, comprising:
a transmissive type liquid crystal display panel having a display function and a light- receiving/imaging function, the display panel including a display area including a plurality of pixels arranged in a matrix, each pixel including a light-emitting element and a light-receiving sensor;
a first image processing section configured to:
(a) receive at least two images from the light-receiving/ imaging function including an image taken while a self-illuminating section is turned on and light is transmitted through the light-emitting element and an image taken while the self-illuminating section is turned off;
(b) perform image processing on the at least two images including combining the at least two images, the image processing performed by the first image processing section resulting in at least a first processed image;
(c) perform a smoothing process on the first processed image for noise reduction:
(d) determine, based at least in part on the first processed image, whether a to-be- detected object has been detected;
(e) generate a detected signal that indicates whether the to-be-detected object has been detected; and
(f) send the generated detection signal to a control section;

a second image processing section configured to:
(a) receive the first processed image; and
(b) perform image processing on the first processed image, the image processing performed by the second image processing section having a heavier processing load than the image processing performed by the first image processing section; and a control section configured to control an operation of the second image processing section in accordance with the generated detection signal such that when the control section determines that the image processing performed by said second image processing section is not necessary, the control section causes the second image processing section to enter a sleep state, wherein the control section suspends a supply of power to the second image processing section during the sleep state, wherein when said second image processing section is in the sleep state, said control section causes the light-receiving/imaging function and the image processing performed by said first image processing section to be repeatedly performed at a first frequency greater than zero, and wherein when said second image processing section is not in the sleep state, said control section causes the light-receiving/imaging function and the image processing performed by said first image processing section to be repeatedly performed at a second frequency that is greater than the first frequency.

2. The display apparatus according to claim 1, wherein said display panel has the display function and the light-receiving/imaging function inside a display area of said display panel, and the to-be-detected object is an object that is in contact with or close to said display panel.

3. The display apparatus according to claim 1, wherein, if said control section determines, after causing said second image processing section to enter the sleep state, that the to-be-detected object has been detected based on the detection signal generated by said first image processing section, said control section returns the second image processing section to normal.

4. The display apparatus according to claim 1, wherein, if said control section determines, after causing said second image processing section to enter the sleep state, that the to-be-detected object has been detected based on the detection signal generated by said first image processing section, said control section returns the second image processing section to normal and causes the intervals of performance of the light- receiving/imaging function and the image processing performed by said first image processing section to return to original time intervals for a time when said second image processing section is not in the sleep state.

5. The display apparatus according to claim 1, wherein, if said control section determines that the to-be-detected object has not been detected for a predetermined period of time, said control section judges that the image processing performed by said second image processing section is not necessary and causes said second image processing section to enter the sleep state.

6. The display apparatus according to claim 1, wherein, when an application of a device does not temporarily need detection of the to-be-detected object, said control section suspends supply of power for said second image processing section and the light-receiving/imaging function.

7. The display apparatus according to claim 1, wherein said first image processing section has:

a first function of eliminating influence of ambient light based on two light-receiving images taken by turning On and Off the self-illuminating section, and generating an image in which the to-be-detected object is made brighter than surroundings by image processing;

a second function of performing a shadow detection process based on the light-receiving image taken when the self-illuminating section is Off, and generating an image in which the to-be-detected object is made bright by image processing; and a third function of performing the first and second functions concurrently to obtain an image in which the to-be-detected object is made bright by processing.

8. The display apparatus according to claim 7, wherein said second image processing section has a function of acquiring information concerning at least one of a position, a shape, and a size of the to-be-detected object while taking a shadow image and a difference image into account.

9. A display apparatus, comprising:
a transmissive type liquid crystal display panel including a display area in which a plurality of pixels arranged in a matrix, each pixel including a light-emitting element and a light-receiving sensor;

a first image processing section configured to:
(a) receive at least two images from the plurality of light-receiving sensors including an image taken while a self-illuminating section is turned on and light is transmitted through the light-emitting element and an image taken while the self-illuminating section is turned off;
(b) perform image processing on the at least two images including combining the at least two images, the image processing performed by the first image processing section resulting in at least a first processed image;
(c) perform a smoothing process on the first processed image for noise reduction:
(d) determine, based at least in part on the first processed image, whether an object is in contact with or close to said display panel;
(e) generate a detection signal that indicates whether the object is in contact with or close to said display panel; and
(f) send the generated detection signal to a control section;

a second image processing section configured to:
(a) receive the first processed image; and
(b) perform image processing on the first processed image, the image processing performed by the second image processing section configured to obtain information of a position in the display area of at least the detected object, the image processing performed by the second image processing section having a heavier processing load than the image processing performed by the first image processing section; and a control section configured to cause said second image processing section to enter a sleep state when the control section determines that the image processing performed by said second image processing section is not necessary based on the detection signal, wherein the control section suspends a supply of power to the second image processing section during the sleep state, wherein when said second image processing section is in the sleep state, said control section causes the light-receiving/imaging function and the image processing performed by said first image processing section to be repeatedly performed at a first frequency greater than zero, and wherein when said second image processing section is not in the sleep state, said control section causes the light-receiving/imaging function and the image processing performed by said first image processing section to be repeatedly performed at a second frequency that is greater than the first frequency.

10. The display apparatus according to claim 9, wherein the plurality of display elements and the plurality of light-receiving sensors are both arranged in a matrix.

11. The display apparatus according to claim 9, wherein said control section causes said second image processing section to enter the sleep state when the detection signal indicates that the object has not been detected.

12. The display apparatus according to claim 9, further comprising a device controller configured to perform processing in accordance with predetermined application software, wherein said control section controls said second image processing section to enter the sleep state when the detection of the object is not required by said device controller.

13. The display apparatus according to claim 12, wherein, when the detection of the object is not required by said device controller, said control section suspends supply of power to said second image processing section after causing said second image processing section to enter the sleep state.

14. A method for controlling a display apparatus including a transmissive type liquid crystal display panel having a display function and a light-receiving/imaging function, the display panel including a display area including a plurality of pixels arranged in a matrix, each pixel including a light-emitting element and a light-receiving sensor, the method comprising:

(a) causing a first image processing section to perform image processing on at least two images received from the light-receiving/imaging function, the two images including an image taken while a self-illuminating section is turned on and light is transmitted through the light-emitting element and an image taken while the self-illuminating section is turned off, the image processing performed by the first image processing section including combining the at least two images and resulting in at least a first processed image;

(b) causing the first image processing section to perform a smoothing process on the first processing image for noise reduction;

(c) causing the first image processing section to determine, based at least in part on the first processed image, whether a to-be-detected object has been detected;

(d) causing the first image processing section to generate a detection signal that indicates whether the to-be-detected object has been detected and send the generated detection signal to a control section;

(e) causing a second image processing section to receive the first processed image and perform image processing on the first processed image, the image processing performed by the second image processing section having a heavier processing load than the image processing performed by the first image processing section; and)

(f) causing the control section to control operation of the second image processing section in accordance with the generated detection signal such that when the control section determines that the image processing performed by the second image processing section is not necessary, the control section causes the second image processing section to enter a sleep state, wherein the control section suspends a supply of power to the second image processing section during the sleep state, and while said second image processing section is in the sleep state, causing said control section to control the light-receiving/imaging function and the image processing performed by said first image processing section to be repeatedly performed at a first frequency greater than zero, and when said second image processing section is not in the sleep state causing said control section to control the light-receiving/imaging function and the image processing performed by said first image processing section to be repeatedly performed a second frequency greater than the first frequency.

15. The display apparatus according to claim 1, further comprising:

a light receiving drive section that drives the plurality of light-receiving elements and is supplied a light receiving signal from each of the light-receiving elements, wherein the light receiving drive section outputs the at least one image to the first image processing section based on the light receiving signals.

16. The display apparatus according to claim 7, wherein the third function includes combining the images generated by the first function and the second function.

17. The display apparatus according to claim 1, wherein the self-illuminating section is a backlight.

* * * * *